(12) United States Patent
Onimaru et al.

(10) Patent No.: US 9,067,477 B2
(45) Date of Patent: Jun. 30, 2015

(54) POWER SUPPLY DEVICE FOR VEHICLE

(75) Inventors: Sadahisa Onimaru, Chiryu (JP); Shinji Andou, Nukata-gun (JP); Seiji Iyasu, Anjo (JP); Kazuyoshi Obayashi, Chita-gun (JP); Akira Sakamoto, Obu (JP); Shigeru Kawano, Chiryu (JP)

(73) Assignees: DENSO CORPORATION, Kariya (JP); NIPPON SOKEN, INC., Nishio (JP)

( * ) Notice: Subject to any disclaimer, the term of this patent is extended or adjusted under 35 U.S.C. 154(b) by 394 days.

(21) Appl. No.: 13/448,524

(22) Filed: Apr. 17, 2012

(65) Prior Publication Data
US 2012/0262881 A1 Oct. 18, 2012

(30) Foreign Application Priority Data

Apr. 18, 2011 (JP) ................................. 2011-092291
Aug. 28, 2011 (JP) ................................. 2011-185396

(51) Int. Cl.
*H05K 7/20* (2006.01)
*B60H 1/32* (2006.01)
(Continued)

(52) U.S. Cl.
CPC .............. *B60H 1/3222* (2013.01); *B60L 1/003* (2013.01); *B60L 1/12* (2013.01); *B60L 11/1812* (2013.01); *B60L 11/1816* (2013.01); *B60L 2210/30* (2013.01); *B60L 2240/36* (2013.01); *B60L 2240/662* (2013.01); *B60L 2240/80* (2013.01); *B60L 3/003* (2013.01); *B60L 11/1868* (2013.01); *B60L 2210/10* (2013.01); *B60L 2210/40* (2013.01); *B60L 2240/34* (2013.01); *B60L 2240/525* (2013.01); *Y02T 10/7005* (2013.01); *Y02T 10/7241* (2013.01); *Y02T 90/16* (2013.01); *Y02T 10/7066* (2013.01);

(Continued)

(58) Field of Classification Search
CPC ..... B60L 3/003; B60L 1/003; B60L 11/1812; B60L 11/1868; B60L 1/12; B60L 2210/30; B60L 2240/662; B60H 1/3222; Y02T 10/7005; Y02T 90/16
USPC ...................... 62/243, 244, 133, 157; 361/701
See application file for complete search history.

(56) References Cited

U.S. PATENT DOCUMENTS 5,546,756 A * 8/1996 Ali ................................. 62/204
5,555,737 A * 9/1996 Takeo et al. ..................... 62/230
(Continued)

FOREIGN PATENT DOCUMENTS

JP 2007-195336 8/2007

OTHER PUBLICATIONS

U.S. Appl. No. 13/328,555, filed Dec. 16, 2011, Obayashi et al.

*Primary Examiner* — Mohammad M Ali
(74) *Attorney, Agent, or Firm* — Nixon & Vanderhye P.C.

(57) ABSTRACT

A power supply device includes a refrigeration cycle having a compressor, a motor, an inverter-integrated charger, a heat exchanger unit, and a controller having a determining unit. The inverter-integrated charger selectively controls operation of the motor using electrical power of a battery and charge of the battery with external power. The heat exchanger unit cools a cooling-necessary part of the inverter-integrated charger using refrigerant in the refrigeration cycle. When the vehicle is stopped and the battery is charged with the external power, the controller makes the inverter-integrated charger serve as: a charger to perform the charge of the battery; or an inverter to control the operation of the motor, thereby driving the compressor, upon determination that the cooling-necessary part needs to be cooled by the determining unit.

20 Claims, 16 Drawing Sheets

(51) Int. Cl.
*B60L 1/00* (2006.01)
*B60L 1/12* (2006.01)
*B60L 11/18* (2006.01)
*B60L 3/00* (2006.01)

(52) U.S. Cl.
CPC ............ *Y02T 10/7216* (2013.01); *Y02T 90/14* (2013.01); *Y02T 90/127* (2013.01); *Y02T 10/7291* (2013.01)

(56) References Cited

U.S. PATENT DOCUMENTS

| | | | | |
|---|---|---|---|---|
| 5,562,538 | A * | 10/1996 | Suyama | 454/75 |
| 5,595,064 | A * | 1/1997 | Ikeda et al. | 62/126 |
| 5,806,330 | A * | 9/1998 | Falkowski et al. | 62/184 |
| 5,880,574 | A * | 3/1999 | Otsuka et al. | 318/811 |
| 6,481,230 | B2 * | 11/2002 | Kimishima et al. | 62/239 |
| 7,179,068 | B2 * | 2/2007 | Makino et al. | 418/55.4 |
| 7,207,187 | B2 * | 4/2007 | Funahashi et al. | 62/228.4 |
| 7,266,969 | B2 * | 9/2007 | Hsu et al. | 62/310 |
| 8,274,262 | B2 * | 9/2012 | Harada | 320/137 |
| 8,674,653 | B2 * | 3/2014 | Hachiya et al. | 320/103 |
| 2002/0043413 | A1 * | 4/2002 | Kimishima et al. | 180/68.1 |
| 2004/0013544 | A1 | 1/2004 | Kimura et al. | |
| 2005/0092479 | A1 * | 5/2005 | Umeo et al. | 165/202 |
| 2006/0090490 | A1 * | 5/2006 | Grimm et al. | 62/181 |
| 2006/0144047 | A1 * | 7/2006 | Inaba et al. | 60/618 |
| 2006/0237247 | A1 * | 10/2006 | Severinsky et al. | 180/65.4 |
| 2009/0024267 | A1 * | 1/2009 | Kawai | 701/22 |
| 2009/0139781 | A1 * | 6/2009 | Straubel | 180/65.1 |
| 2009/0177345 | A1 * | 7/2009 | Severinsky et al. | 701/22 |
| 2009/0242288 | A1 * | 10/2009 | Oyobe et al. | 180/65.265 |
| 2009/0306841 | A1 * | 12/2009 | Miwa et al. | 701/22 |
| 2010/0025127 | A1 * | 2/2010 | Oyobe | 180/65.22 |
| 2010/0072946 | A1 * | 3/2010 | Sugano | 320/108 |
| 2010/0089669 | A1 * | 4/2010 | Taguchi | 180/65.1 |
| 2010/0132388 | A1 * | 6/2010 | Oyobe et al. | 62/157 |
| 2010/0237694 | A1 * | 9/2010 | Fuma et al. | 307/9.1 |
| 2010/0270860 | A1 * | 10/2010 | Kamaga | 307/10.7 |
| 2011/0004363 | A1 * | 1/2011 | Severinsky et al. | 701/22 |

* cited by examiner

POWER SUPPLY DEVICE FOR VEHICLE

CROSS REFERENCE TO RELATED APPLICATION

This application is based on Japanese Patent Applications No. 2011-92291 filed on Apr. 18, 2011 and No. 2011-185396 filed on Aug. 28, 2011, the disclosures of which are incorporated herein by reference.

TECHNICAL FIELD

The present disclosure relates to a power supply device for a vehicle, which is arranged integrally with a refrigeration cycle for air conditioning, allowing charging of a battery from outside the vehicle.

BACKGROUND

As an example of the existing power supply device for a vehicle, there is the type described in JP-A-2007-195336. Here, the power supply device for a vehicle of JP-A-2007-195336 is characterized in that in a hybrid automobile or electric automobile, an inverter that controls the operation of an accessory motor different from the motor for running also works as a converter for charging of the vehicle battery.

In JP-A-2007-195336, the accessory motor is explained with reference to a motor for driving a compressor for air conditioning as an example. Here, charge of the vehicle battery is carried out when the vehicle is stopped and the ignition key switch is turned off. Consequently, in this case, there is no need to turned on the accessory motor (compressor for air conditioning), so that the inverter for the accessory motor is used as the converter for charge of the vehicle battery.

However, the inverter has multiple switch elements, which are controlled on/off by a driving circuit, and other electronic parts, and heating takes place in company with switching of the switching elements when the inverter is in operation, so that it requires an efficient cooling. The aforementioned JP-A-2007-195336 merely discloses that the inverter of the accessory motor also works for charge of the vehicle battery, and it has no description at all on how to combine and control the operation of air conditioner and charge of the vehicle battery from the viewpoint of cooling of the inverter.

In addition, the technology for cooling the inverter carried on the compressor for air conditioning by the refrigerant circulated in the refrigeration cycle is well known (for example, see JP-A-2004-100683), while there is no description with regard to a combination with the charge as explained above.

SUMMARY

According to the present disclosure, there is provided a power supply device adapted to be disposed in a vehicle having a battery. The power supply device includes a refrigeration cycle for air conditioning, a motor, an inverter-integrated charger, a heat exchanger unit, and a controller. The refrigeration cycle includes a compressor, a condenser, an expansion valve, and an evaporator. The motor is configured to drive the compressor. The inverter-integrated charger is configured to selectively control operation of the motor using electrical power of the battery and charge of the battery with external power. The heat exchanger unit is disposed in the refrigeration cycle, and is configured to cool a cooling-necessary part of the inverter-integrated charger using refrigerant in the refrigeration cycle. The controller is configured to control operation of the inverter-integrated charger, and includes a determining means for determining whether the cooling-necessary part needs to be cooled. When a traveling function of the vehicle is stopped and the battery is charged with the external power, the controller makes the inverter-integrated charger serve as: a charger to perform the charge of the battery; or an inverter to control the operation of the motor, thereby driving the compressor, upon determination that the cooling-necessary part needs to be cooled by the determining means.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
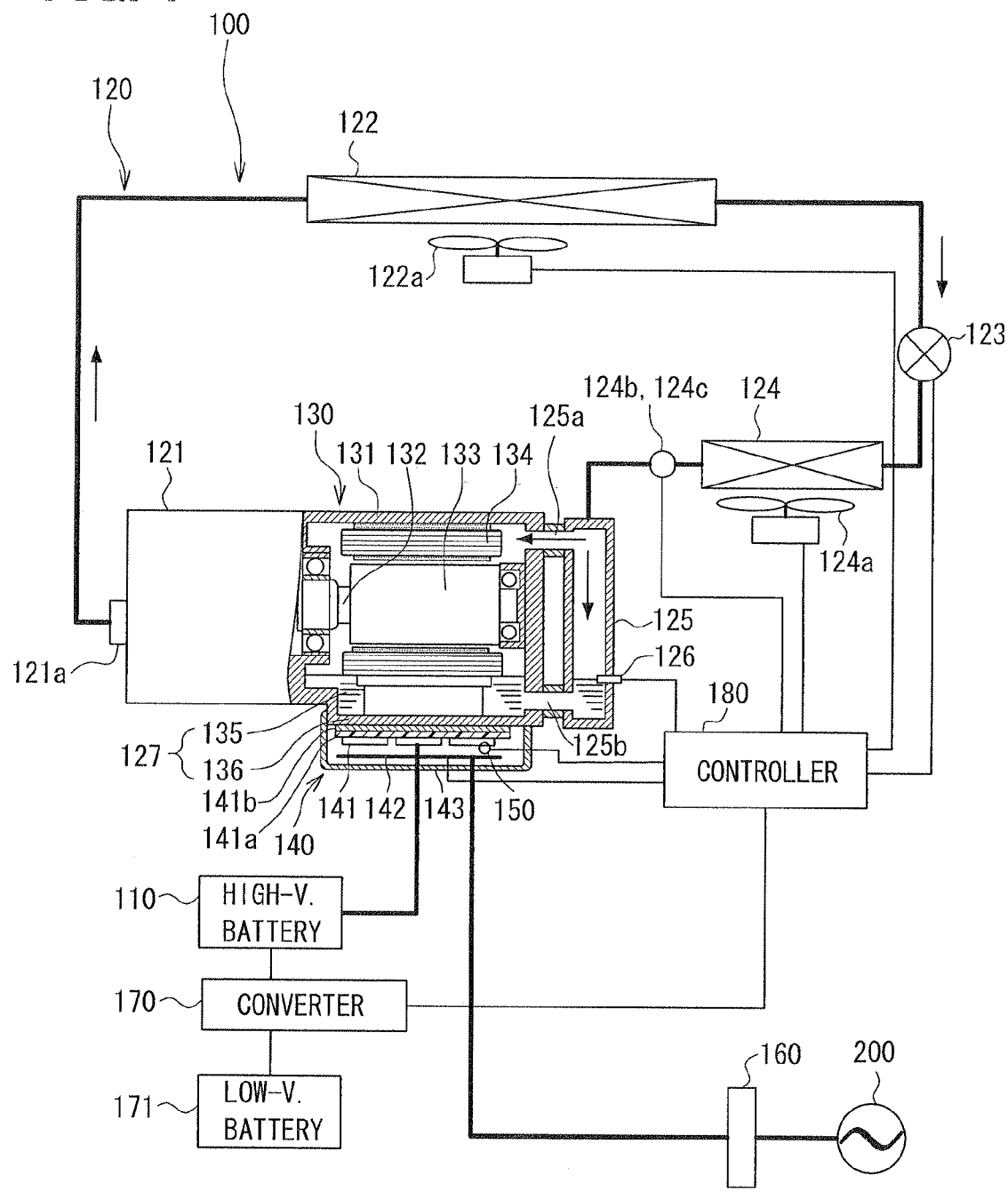
FIG. 1 is a schematic diagram illustrating a constitution of a power supply device for a vehicle in a first embodiment.

In the following, embodiments will be explained with reference to the accompanying drawings. The same reference numerals will be adopted throughout the various embodiments to represent the parts corresponding to the items explained with regard to the preceding embodiments, and repeated explanation will be omitted. When only a portion of the constitution of an embodiment is explained, the remaining portions of the constitution are the same as those in the other embodiments that have been explained. In addition to combinations of parts of the various embodiments with explicit description to allow such combinations, even when not described explicitly, embodiments may also be partially combined with each other as long as there is no obstacle caused by such combination.

First Embodiment

In the following, a power supply device 100 for a vehicle in a first embodiment will be explained with reference to FIGS. 1 through 4.

Here, a power supply device 100 for a vehicle is a power supply device carried on a plug-in hybrid automobile or electric automobile having a motor for running as the driving source for running and a high-voltage battery 110 that supplies electric power to the motor for running. As shown in FIG. 1, the power supply device for the vehicle has the following parts: a refrigeration cycle 120, a motor 130, an inverter integrated charger 140, a temperature sensor 150, a power receiving part 160, a converter 170, a low voltage battery 171, a controller 180, etc. The power supply device 100 carries out control of charge of the high-voltage battery 110 by the inverter integrated charger 140 and control of operation of the motor 130 that drives a compressor 121 in the refrigeration cycle 120.

The high-voltage battery 110 is a storage battery that stores electric power, and at the same time, supplies the stored electric power to the motor 130 (inverter integrated charger 140) and supplies electric power to the motor for running not shown in the figure. Here, the high-voltage battery 110 has a voltage of a few hundred volts (for example, 200 V).

The aforementioned refrigeration cycle 120 is a thermal cycle for air conditioning the interior of the vehicle cabin (for cooling), and it has the following parts: the compressor 121, a condenser 122, an electromagnetic expansion valve 123, an evaporator 124, a gas/liquid separator 125, a liquid surface sensor 126, a heat exchanger 127, etc.

In the refrigeration cycle 120, the compressor 121, a fluid machine, sucks in the gas phase refrigerant flowing out from the evaporator 124 from an inlet not shown in the figure, and compresses it to high temperature and high pressure by an internal compressing mechanism. Then, it ejects the compressed refrigerant through an outlet 121a to the condenser 122. For example, the compression mechanism of the compressor 121 uses, for example, a scroll-type compression mechanism having a stationary scroll and a rotating scroll. In the scroll-type compression mechanism, a rotating shaft 132 of the motor 130 is connected with the rotating scroll, and, as the motor 130 is turned on, the rotating scroll is driven to rotate with respect to the stationary scroll. As a result, the space (compressing chamber) formed between the two scrolls is repeatedly expanded and contracted, so that the refrigerant is sucked in, compressed and ejected.

The motor 130 is a rotating motor that drives the compressor 121 as explained above, and it is, for example, a 3-phase brushless DC motor. Here, the motor 130 is formed integrated with the compressor 121, and the compressor 121 is formed as an electric compressor. The motor 130 has the following parts within a cylindrical housing 131: a rotor 133 anchored on the rotating shaft 132, and a stator 134 anchored on the inner peripheral surface of the housing 131 arranged on the outer peripheral side of the rotor 133. As power is turned on for the stator 134, the motor 130 has the rotor 133 rotate together with the rotating shaft 132, so that the compressor 121 (the rotating scroll) is driven.

In the lower portion inside the housing 131, a space portion is formed for storing the liquid phase refrigerant among the refrigerant subjected to gas/liquid separation by the gas/liquid separator 125. This space portion becomes a refrigerant reservoir portion 135. The bottom portion of the refrigerant reservoir portion 135 is formed by a portion of the wall surface of the housing 131. In the following, the bottom portion of the refrigerant reservoir portion 135 will be called a bottom wall portion 136.

The condenser 122 in the refrigeration cycle 120 is a heat exchanger that cools the refrigerant ejected from the compressor 121 to a liquid phase refrigerant by a heat exchanger structure having tubes arranged in multiple layers laminated with each other and having refrigerant flowing inside them and wavy shaped fins included between the tubes. Here, a cooling fan 122a driven by a fan motor is arranged in the condenser 122, and, by the cooling air fed by the cooling fan 122a, cooling of the aforementioned refrigerant is accelerated. The cooling fan 122a (fan motor) is driven by the electric power fed from the low voltage battery 171. Here, operation of the cooling fan 122a is controlled by the controller 180.

The aforementioned electromagnetic expansion valve 123 is a pressure decreasing means that makes pressure decreasing expansion of the liquid phase refrigerant flowing out from the condenser 122 at low pressure and low temperature. Here, the electromagnetic expansion valve 123 is an electromagnetic shut-off valve, with the degree of opening of the valve adjusted by the controller 180. When the refrigeration cycle 120 is turned on, the degree of opening of the valve in the electromagnetic expansion valve 123 is decreased, increasing the pressure difference between the high pressure side in the portion from the compressor 121 to the electromagnetic expansion valve 123 and the low pressure side in the portion from the electromagnetic expansion valve 123 to the evaporator 124, and the refrigerant on the low pressure side becomes a lower temperature (for example, around 0° C.). On the contrary, when the degree of opening of the valve in the electromagnetic expansion valve 123 is increased, the pressure difference between the high pressure side and the low pressure side becomes smaller. When the degree of opening of the valve in the electromagnetic expansion valve 123 reaches the maximum level (fully opened), the pressure decreasing effect disappears, and the pressure on the high pressure side and that on the low pressure side becomes nearly equal to each other. That is, in this state, there is little pressure difference.

Just like the condenser 122, the evaporator 124 is also a heat exchanger that makes heat exchange between the liquid phase refrigerant flowing out from the electromagnetic expansion valve 123 and the air for air conditioning fed by an air blowing fan 124a in a heat exchange portion equipped with tubes arranged in multiple layers laminated with each other and having a refrigerant flowing inside them and wavy shaped fins included between the tubes. In the evaporator 124, the air for air conditioning is cooled by the low temperature liquid phase refrigerant flowing in the interior. The aforementioned air blowing fan 124a has an air feeding motor, and the air blowing fan 124a (air feeding motor) is driven by the electric power fed from the low voltage battery 171. The operation of the air blowing fan 124a is controlled by the controller 180.

On the refrigerant ejecting side of the evaporator 124, a pressure sensor 124b that detects the pressure of the refrigerant and a temperature sensor 124c that detects the temperature of the refrigerant are arranged. The pressure signal and temperature signal detected with the aforementioned pressure sensor 124b and the temperature sensor 124c are output to the controller 180.

The aforementioned gas/liquid separator 125 is a separating means for separating gas and liquid of the refrigerant flowing out from the evaporator 124. For example, the gas/liquid separator 125 is formed as a slender vessel extending in the vertical direction, with the refrigerant flowing out from the evaporator 124 flow into its internal space. In the internal space of the gas/liquid separator 125, the gas phase refrigerant with a lower density is accumulated in the upper portion, while the liquid phase refrigerant with a higher density is accumulated in the lower portion, so that gas/liquid separation can be realized.

The internal space of the gas/liquid separator 125 is connected with the internal space of the housing 131 of the motor 130 via a connecting channel 125a and a connecting channel 125b. Here, the connecting channel 125a is connected with the upper portion of the housing 131 arranged above the gas/liquid separator 125. On the other hand, the connecting channel 125b is connected with the lower portion of the housing 131 arranged below the gas/liquid separator 125. Consequently, the gas phase refrigerant inside the gas/liquid separator 125 flows through the connecting channel 125a to the upper portion inside the housing 131, while the liquid phase refrigerant inside the gas/liquid separator 125 flows through the connecting channel 125b to the lower portion inside the housing 131, that is, it flows into the refrigerant reservoir portion 135. As the gas/liquid separator 125 and the refrigerant reservoir portion 135 are connected with each other via the connecting channel 125b, the level of the liquid phase refrigerant inside the gas/liquid separator 125 becomes the same as the level of the liquid phase refrigerant inside the refrigerant reservoir portion 135. In addition, the upper portion of internal space of the housing 131 is connected with the inlet of the compressor 121, so that mainly the gas phase refrigerant among the gas phase refrigerant and liquid phase refrigerant flowing into the internal space of the housing 131 is made to reflux through the inlet into the compressor 121.

The aforementioned liquid surface sensor 126 is a level detecting means (corresponding to the second level detecting unit in the present disclosure) that detects the level of the liquid phase refrigerant inside the gas/liquid separator 125 and the refrigerant reservoir portion 135. For example, it is arranged on the gas/liquid separator 125. The aforementioned liquid surface sensor 126 can judge whether the level of the liquid phase refrigerant inside the gas/liquid separator 125 and the refrigerant reservoir portion 135 is equal to or higher than a predetermined level. The predetermined level in this embodiment corresponds to the second predetermined level in the present disclosure, and it is set as the level (refrigerant quantity) that allows sufficient cooling of the inverter integrated charger 140 (switching elements 141) by the liquid phase refrigerant. The level signal of the predetermined level detected with the liquid surface sensor 126 is output to the controller 180.

The aforementioned heat exchanger 127 is a heat exchange means that uses the bottom wall portion 136 of the housing 131 as the heat transfer portion to form the liquid phase refrigerant accumulated in the refrigerant reservoir portion 135 as the cooling medium. The liquid phase refrigerant inside the refrigerant reservoir portion 135 is a refrigerant in the low pressure state before compression by the compressor 121. The aforementioned heat exchanger 127 uses the liquid phase refrigerant to cool the switching element 141 of the inverter integrated charger 140 arranged in contact with the outer side of the bottom wall portion 136. In the heat exchanger 127, as cooling takes place, the liquid phase refrigerant is evaporated by the heat received from the switching element 141. Consequently, in order to continuously cool the switching element 141, a sufficient quantity of the liquid phase refrigerant should be stored in the refrigerant reservoir portion 135. For example, the level detected by the liquid surface sensor 126 should be equal to or higher than the aforementioned predetermined level.

The aforementioned inverter integrated charger 140 is a converting part having two functions integrated in a single body, and it works as follows: the AC electric power from a commercial power supply 200 (corresponding to the external electric power in the present disclosure) is converted to a DC electric power for charging the high-voltage battery 110 (it works as a charger), and at the same time, the DC electric power of the high-voltage battery 110 is converted to 3-phase AC electric power that is fed to the motor 130 to turned on the motor 130 (it works as an inverter). For example, when the ignition switch, start switch, or the like of the vehicle is turned off and the vehicle's running function is turned off, the inverter integrated charger 140 carries out the aforementioned charge under control of the controller 180 based on the charge request by the driver. In addition, for example, when the ignition switch, start switch or the like of the vehicle is turned on so that the vehicle can run, the inverter integrated charger 140 feeds electric power to the motor 130 under control of the controller 180 based on the air conditioning request by the driver, so that the compressor 121 is turned on. In addition, as to be explained later, for this power supply device 100 for vehicle, even when the aforementioned charge is carried out, the motor 130 can still be temporarily turned on by the inverter integrated charger 140. In order to facilitate the following explanation, the state when the vehicle has its running function turned off will be called "when stopped from running", while the state when the vehicle can run will be called "when running".

The aforementioned inverter integrated charger 140 has the switching element 141 and a controller circuit 142 accommodated inside a cover 143, and it is arranged on the outer lower side of the bottom wall portion 136 of the motor housing 131. Consequently, the heat exchanger 127 and the inverter integrated charger 140 are formed integrated in the housing 131 of the motor 130.

The aforementioned switching element 141 has plural (for example, 6, or more added when a circuit having both the function of inverter and the function of charger is to be formed) switch parts. By its on/off switching operation, the DC electric power applied from the high-voltage battery 110 is converted to 3-phase AC electric power that is fed as the driving electric power to the motor 130. For the switching element 141, as heating takes place due to loss in the electric power, it becomes a cooling-necessary part as cooling is necessary. For this purpose, it is jointed with a surface of an insulating plate 141a, and the other surface of the insulating plate 141a is jointed with a surface of a heat dissipating plate 141b. The other surface of the heat dissipating plate 141b is anchored so that it makes contact with the bottom wall portion 136 (heat exchanger 127) of the motor housing 131. Consequently, the heat generated from the switching element 141 can be transferred at a high efficiency via the insulating plate 141a and the heat dissipating plate 141b to the bottom wall portion 136.

In addition, the controller circuit 142 controls the switching operation of the aforementioned switching element 141, and its operation is controlled by the controller 180. Even when the vehicle is stopped from running, the aforementioned controller circuit 142 and the controller 180 are still in a working state for charging the high-voltage battery 110, and they control the switching operation of the aforementioned switching element 141.

The aforementioned temperature sensor 150 is a temperature detecting unit for detecting the temperature of the switching element 141. The temperature signal detected with this temperature sensor 150 is output to the controller 180.

The power receiving part 160 is a power receiving means that receives electric power from the commercial power supply 200. For example, it may be a plug with one end connectable to the socket of the commercial power supply 200, or a power cord having a connector or the like that can be connected with the commercial power supply 200. The other end of the power cord is connected with the inverter integrated charger 140.

The converter 170 is a voltage transforming part for adjusting the voltage of the high-voltage battery 110. It decreases the voltage of a few hundred volts of the high-voltage battery 110 to ten volts (for example, 14 V) that is fed to the low voltage battery 171. The operation of converter 170 is controlled by the controller 180. The electric power of the low voltage battery 171 is fed to various types of accessory parts, ranging from the aforementioned cooling fan 122a and the air blowing fan 124a to headlights, wipers, etc. equipped on the vehicle.

The aforementioned controller 180 is a control means in the power supply device 100 for a vehicle. Here, as the controller 180 controls the operation of the inverter integrated charger 140, it is possible to carry out control of air conditioning by the refrigeration cycle 120 and control of charge to the high-voltage battery 110. Details of the contents of control by the controller 180 will be explained later.

In the following, the operation of the power supply device 100 for a vehicle with the aforementioned constitution will be explained with reference to FIG. 2-FIG. 4 as additional drawings.

Control of the refrigeration cycle will be described.

When the vehicle is running, upon the request by the driver for air conditioning, the controller 180 controls the operation so that the inverter integrated charger 140 functions as an inverter. As a result, the electric power of the high-voltage battery 110 is fed to the motor 130 so that the motor 130 is turned on to drive the compressor 121. In addition, while the controller 180 turns on the air blowing fan 124a, depending on the pressure signal from the pressure sensor 124b at the exit side of the evaporator 124, and the temperature signal from the temperature sensor 124c, it also adjusts the degree of opening the valve in the electromagnetic expansion valve 123, and it turns on the cooling fan 122a.

As explained above, the refrigeration cycle 120 is turned on, the refrigerant ejected from the compressor 121 is cooled by the condenser 122 and it has the pressure decreased to a low temperature and low pressure state by the electromagnetic expansion valve 123. In the evaporator 124, the air for air conditioning fed by the air blowing fan 124a is cooled by the refrigerant at low temperature and low pressure. In this case, to have the temperature of the air for air conditioning become the temperature requested by the driver, the operation rotation velocity of the compressor 121 is controlled, or the degree of opening of the valve in the electromagnetic expansion valve 123 is controlled on the basis of the pressure and temperature of the refrigerant on the outlet side of the evaporator 124. Here, the refrigerant flowing out from the evaporator 124 has the gas and liquid separated from each other by the gas/liquid separator 125, and, among the separated phases of the refrigerant, the gas phase refrigerant flows mainly upward inside the housing 131 of the motor 130, and it is sucked into the compressor 121. On the other hand, the liquid phase refrigerant among the phases of the refrigerant separated by the gas/liquid separator 125 is accumulated in the refrigerant reservoir portion 135 in the lower portion inside the housing 131.

In the inverter integrated charger 140 controlled to work as an inverter, the switching element 141 is heated up in particular due to the operation. However, the switching element 141 is cooled by the liquid phase refrigerant stored in the refrigerant reservoir portion 135.

Change control of the high-voltage battery will be described.

When the vehicle is stopped from running, as the driver has the power receiving part 160 connected with the commercial power supply 200 and makes a request for charge, the controller 180 controls to carry out charge to the high-voltage battery 110 by the inverter integrated charger 140.

Figure 2:
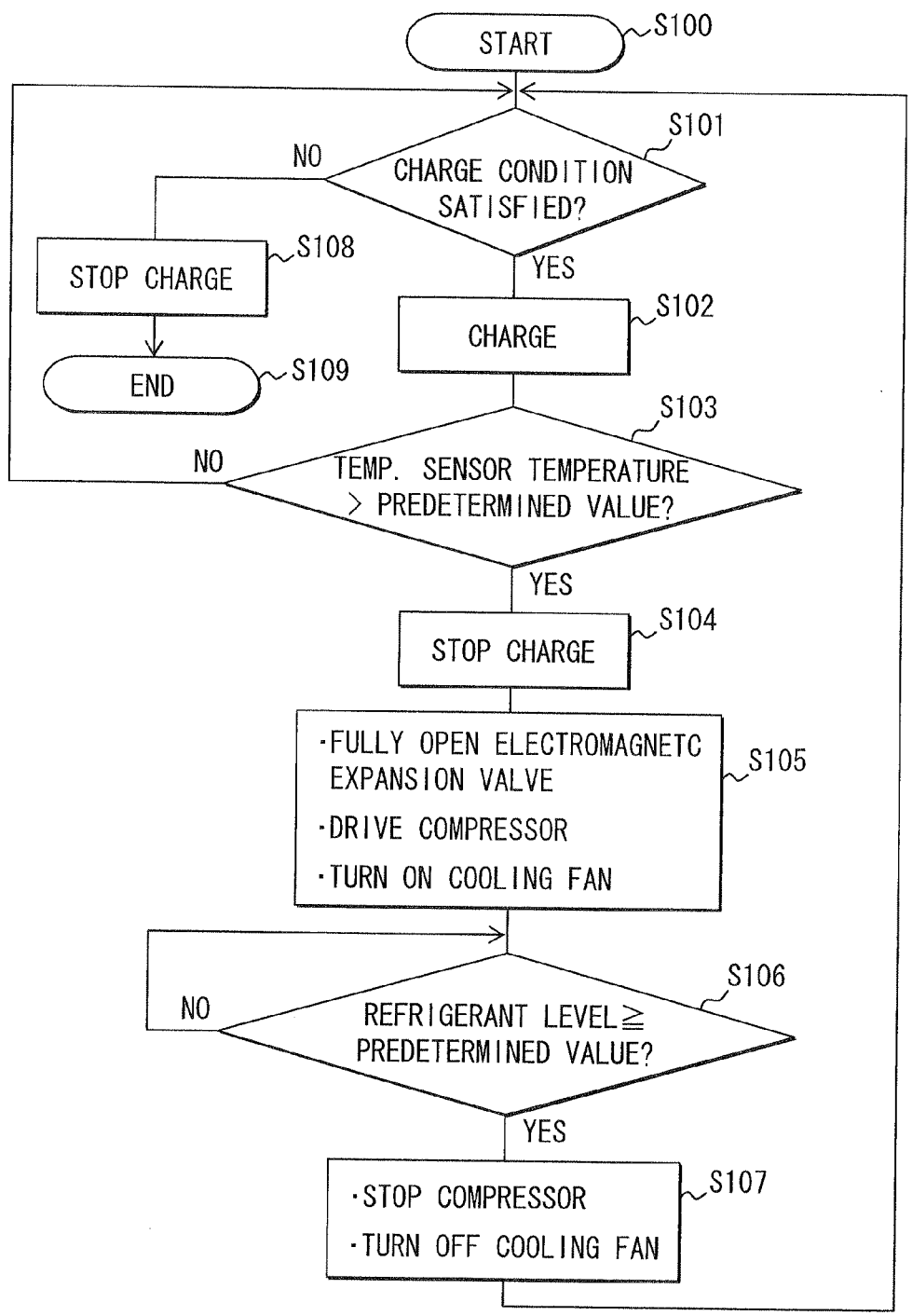
FIG. 2 is a flow chart illustrating the contents of control of an inverter integrated charger carried out by a controller in the first embodiment.

As shown in FIG. 2, in step S100, the controller 180 starts control for charge, and, in step S101, it judges whether the charge condition is met. With regard to the charge condition, the controller 180 judges whether the charge condition is met according to the facts, such as the fact that the power receiving part 160 is connected with the commercial power supply 200, or the fact that the high-voltage battery 110 is not fully charged.

When it is judged in step S101 that the charge condition is met, in step S102, the controller 180 carries out charge by the inverter integrated charger 140. That is, the controller 180 controls the operation so that the inverter integrated charger 140 works as a charger, so that the AC electric power of the commercial power supply 200 is converted to the DC electric power for charging the high-voltage battery 110. In this case, as the inverter integrated charger 140 is turned on, just as in the case of control of the aforementioned refrigeration cycle, in particular, the switching element 141 is heated up. The switching element 141 is cooled by the liquid phase refrigerant stored in the refrigerant reservoir portion 135 of the heat exchanger 127 as the refrigeration cycle 120 is turned on while the vehicle runs as explained above. However, as heating of the switching element 141 continues, the liquid phase refrigerant is evaporated by the heat of the switching element 141. As the liquid phase refrigerant is entirely evaporated, cooling cannot be carried out, and the temperature of the switching element 141 rises significantly.

In consideration of this case, in step S103, the controller 180 judges whether the temperature signal obtained from the temperature sensor 150 (the temperature of the switching element 141) is over a predetermined temperature (for example, 120° C.). Step S103 corresponds to the determining means in the present disclosure. Here, the predetermined temperature refers to the upper limit temperature for use needed for maintaining the basic functions and quality in the inverter integrated charger 140 even when the temperature of the inverter integrated charger 140 (switching element 141) rises as it is in use. If the judgment result is NO in step S103, it returns to step S101, and the charge of step S102 continues.

However, when the result of judgment is YES in step S103, the controller 180 controls to stop the operation of the inverter integrated charger 140 and temporarily stops the charge in step S104. That is, when the temperature of the switching element 141 is over the predetermined temperature, it is possible to judge that cooling should be carried out to have the temperature of the switching element 141 equal to or lower than the predetermined temperature. Then, in the next steps S105 and S106, control is carried out so that sufficient liquid phase refrigerant is accumulated in the refrigerant reservoir portion 135 of the heat exchanger 127 to ensure cooling of the switching element 141.

That is, in step S105, the controller 180 controls to have the degree of opening of the valve in the electromagnetic expansion valve 123 in the fully opened state, and it controls to have the inverter integrated charger 140 work as an inverter, so that the compressor 121 is driven by the motor 130, and the cooling fan 122a is turned on.

Figure 3:
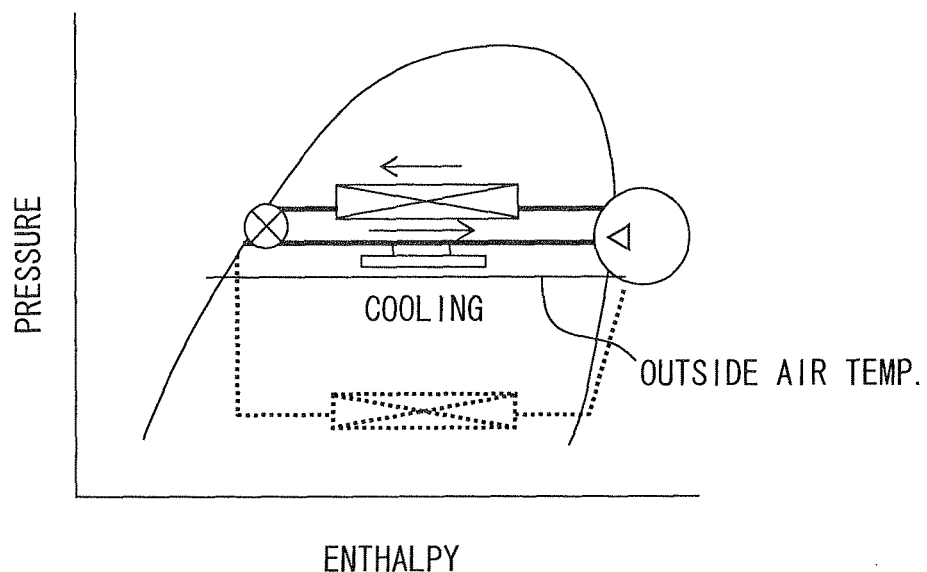
FIG. 3 is a Mollier chart illustrating an operation state of a refrigeration cycle in the first embodiment.
Figure 4:
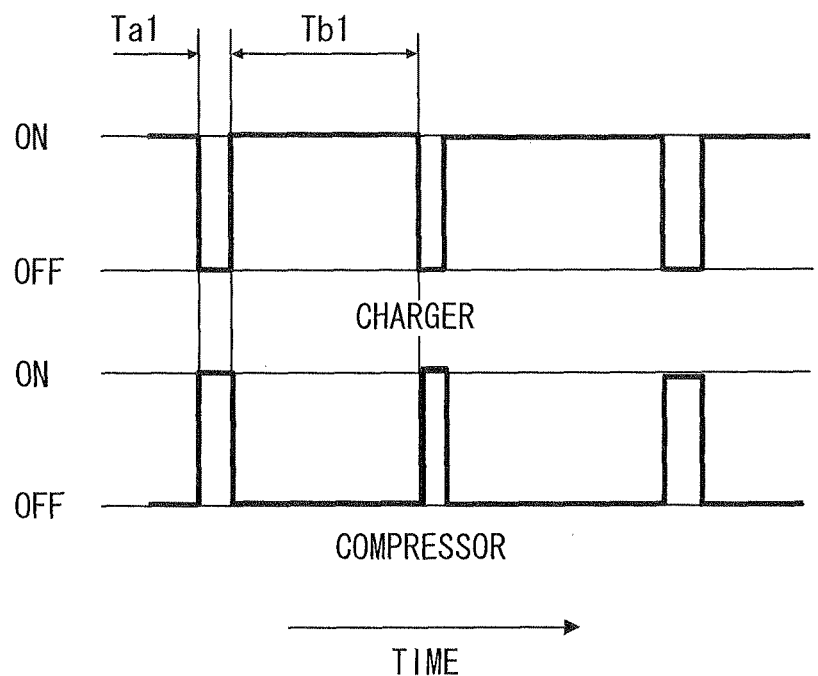
FIG. 4 is a time chart illustrating an operation state of the inverter integrated charger in the first embodiment.

Then, as shown in FIG. 3, in the refrigeration cycle 120, because the electromagnetic expansion valve 123 is in fully opened state, there is little pressure difference between the high pressure side and the low pressure side, and the refrigerant inside the refrigeration cycle 120 is simply circulated by the compressor 121. The refrigerant ejected from the compressor 121 is cooled to a temperature near the temperature of the cooling air (external air temperature) fed by the cooling fan 122a in the condenser 122, and it is condensed to become the liquid phase refrigerant. Then, the liquid phase refrigerant goes through the electromagnetic expansion valve 123 and the evaporator 124 to reach the gas/liquid separator 125. Here, because the air blowing fan 124a is off in operation, in the evaporator 124, the liquid phase refrigerant is not gasified, and it flows into the gas/liquid separator 125. Then, the liquid phase refrigerant separated by the gas/liquid separator 125 accumulated in the refrigerant reservoir portion 135.

Then, in step S106, the controller 180 judges whether the level of the liquid phase refrigerant in the refrigerant reservoir portion 135 obtained from the liquid surface sensor 126 is equal to or higher than the predetermined level. When the judgment result in step S106 is YES, the controller 180 judges that the quantity of liquid phase refrigerant in the refrigerant reservoir portion 135 is sufficient for cooling the inverter integrated charger 140. In step S107, the inverter integrated charger 140 is turned off, so that the motor 130, and hence the compressor 121, are turned off, and the cooling fan 122a is also turned off.

Then, it returns again to step S101, and the inverter integrated charger 140 is made to work as a charger. As a result, the high-voltage battery 110 is charged. In this case, the switching element 141 is again cooled by the liquid phase refrigerant accumulated in the refrigerant reservoir portion 135.

On the other hand, when it is judged that the high-voltage battery 110 is fully charged due to the aforementioned charge or the power receiving part 160 is detached from the commercial power supply and the charge condition is not met in step S101, the controller 180 stops the charge in step S108, and this control operation comes to an end in step S109.

In the following, the operation state of the inverter integrated charger 140 will be further explained with reference to FIG. 4. When the inverter integrated charger 140 works as a charger for charging the high-voltage battery 110, the motor 130, and hence the compressor 121, are in off state. Then, as the temperature of the switching element 141 of the inverter integrated charger 140 rises over the predetermined temperature during the charge, the inverter integrated charger 140 works as an inverter. That is, it is turned off as a charger, and the motor 130, and hence the compressor 121, are turned on, so that the liquid phase refrigerant is accumulated in the refrigerant reservoir portion 135. The time of the period when the compressor 121 is turned on is, for example, Ta1. Then, when the level of the liquid phase refrigerant is equal to or higher than the predetermined level, the inverter integrated charger 140 works again as a charger, so that charge of the high-voltage battery 110 is restarted. The time of the period when it works as a charger is, for example, Tb1. During the charge, the motor 130, and hence the compressor 121, are in the off state. In this way, the aforementioned operation is carried out repeatedly in the inverter integrated charger 140.

According to an example of computing of the thermal balance for a device with the aforementioned control, suppose the thermal power generated by the switching element 141 when charged, with 200 cc of the liquid phase refrigerant at 40° C. accumulated in the refrigerant reservoir portion 135, is 200 W, if this thermal power is entirely used in gasification of the refrigerant, it is possible to keep cooling in Tb1 of about 3 min. The time needed for accumulating 200 cc of the liquid phase refrigerant is Ta1 of about 5 sec. to about 10 sec. As a matter of fact, the time may not be what computed above due to difference in various conditions, such as influence of the startup time of the compressor, the external air temperature, thermal power generated, etc.

As explained above, according to the first embodiment, when the vehicle is stopped from running, the inverter integrated charger 140 is made to work as a charger so that it is possible to charge the high-voltage battery 110. In this case, the switching element 141 of the inverter integrated charger 140 is cooled by the heat exchanger 127 using the liquid phase refrigerant in the refrigeration cycle 120. However, as this cooling operation is carried out, the liquid phase refrigerant is evaporated to become the gas phase refrigerant by the heat received from the switching element 141, so that the aforementioned cooling function cannot be maintained, and the temperature of the switching element 141 rises. As a result, as the temperature of the switching element 141 exceeds the predetermined temperature, the inverter integrated charger 140 is made to work as an inverter, and the operation of the motor 130 is controlled to drive the compressor 121. Consequently, the evaporated gas phase refrigerant is circulated inside the refrigeration cycle 120, it is condensed by the condenser 122 to liquid phase refrigerant, and the formed liquid phase refrigerant is again made to reflux to the heat exchanger 127. As a result, the obtained liquid phase refrigerant can be used to continue cooling the switching element 141 during charging.

In addition, when the compressor 121 is turned on, the degree of opening of the valve in the electromagnetic expansion valve 123 is fully opened, and the pressure of the high pressure side and the pressure of the low pressure side of the refrigeration cycle 120 become the same.

Usually, the temperature of the inverter integrated charger 140 in operation is higher than the temperature of the refrigerant when the refrigeration cycle 120 is turned off (equal to the external air temperature). Consequently, even when the refrigerant that becomes a low temperature on the low pressure side when the refrigeration cycle 120 is turned on is not used as the liquid phase refrigerant adopted in the heat exchanger 127, a refrigerant corresponding to the external air temperature can be used in cooling the switching element 141.

Consequently, when the switching element 141 is cooled, even when the degree of opening of the valve in the electromagnetic expansion valve 123 is fully opened, and the pressure on the high pressure side and the pressure on the low pressure side of the refrigeration cycle 120 are the same, it is still possible to cool the switching element 141 using the liquid phase refrigerant under such condition. Consequently, because the compressor 121 is driven so that there is no pressure difference between the high pressure side and the low pressure side, it is possible to minimize the driving power of the compressor 121. As the driving power of the compressor 121 is suppressed, noises of the compressor 121 can be decreased correspondingly.

Also, when the level of the liquid phase refrigerant in the refrigerant reservoir portion 135 is equal to or higher than the predetermined level after driving of the compressor 121, driving of the compressor 121 is turned off, and the inverter integrated charger 140 is made to work as a charger so that charge to the high-voltage battery 110 is restarted.

In this way, if the level of the liquid phase refrigerant accumulated in the refrigerant reservoir portion 135 is equal to or higher than the predetermined level, it is possible to clearly judge that cooling of the inverter integrated charger 140 can be carried out sufficiently by the aforementioned liquid phase refrigerant. Consequently, by having the inverter integrated charger 140 work as a charger based on the aforementioned judgment, the inverter integrated charger 140 is not excessively made to work as an inverter to keep driving the compressor 121.

When the compressor 121 is driven, the cooling fan 122a of the condenser 122 is turned on. Consequently, it is possible to improve the cooling ability of the refrigerant in the condenser 122, and it is possible to feed more liquid phase refrigerant to the heat exchanger 127 in a short time.

In addition, as the heat exchanger 127 and the inverter integrated charger 140 are formed integrated in the housing 131 of the motor 130, it is possible to have a compact shape of the heat exchanger 127, the motor 130 and the inverter integrated charger 140. In addition, as the motor 130 and the inverter integrated charger 140 are formed integrated, it is possible to have a shorter wiring for connecting them.

Second Embodiment

In the following, a power supply device 100 for a vehicle in a second embodiment will be explained with reference to FIGS. 5 through 7. The power supply device for a vehicle in the second embodiment has the same constitution as that of the power supply device 100 for a vehicle in the aforementioned the first embodiment, except that the contents of control in the charge mode are changed. In the flow chart shown in FIG. 5, step S205 is adopted in place of step S105 in FIG. 2.

Figure 5:
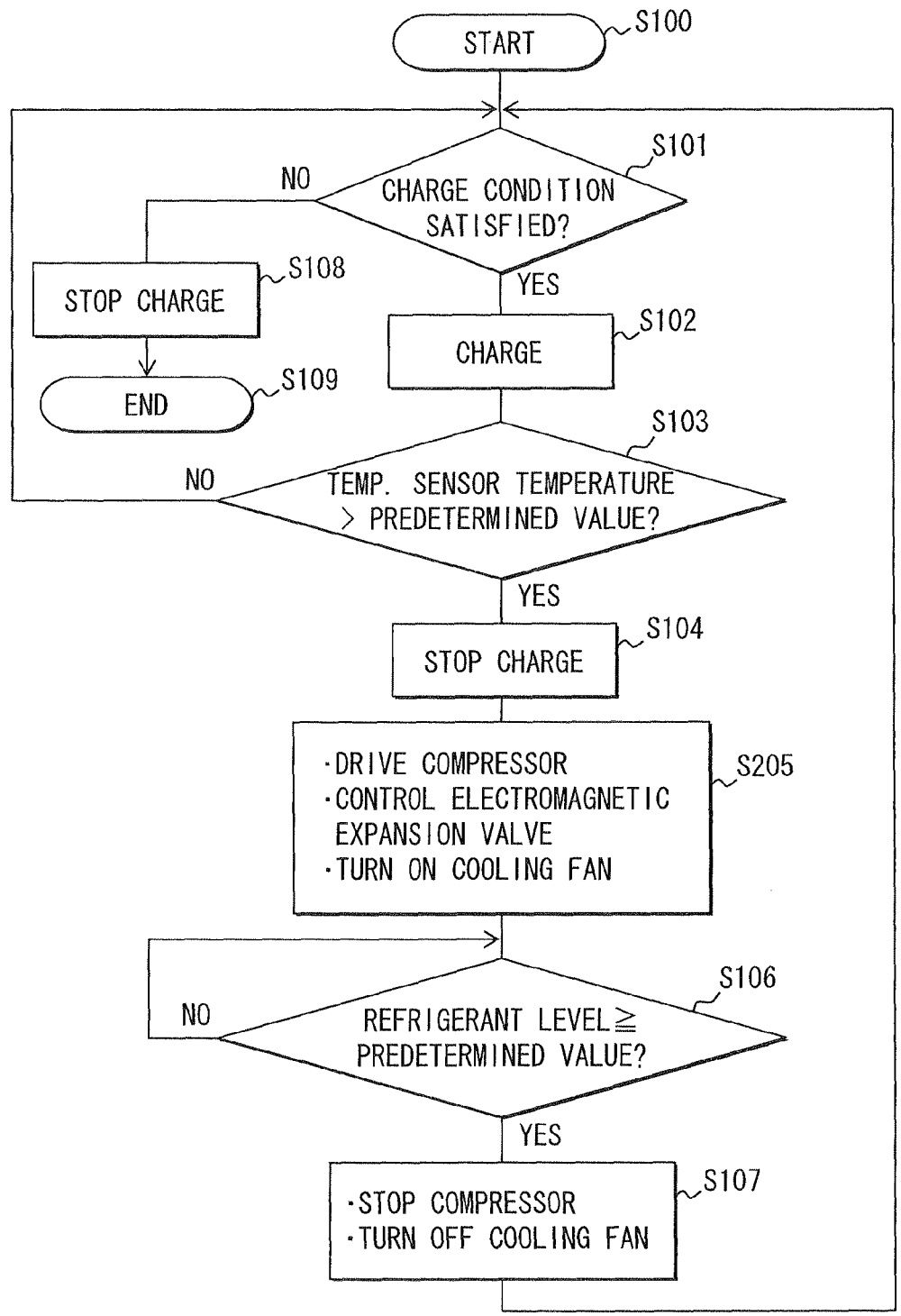
FIG. 5 is a flow chart illustrating the contents of control of an inverter integrated charger carried out by a controller in a second embodiment.
Figure 6:
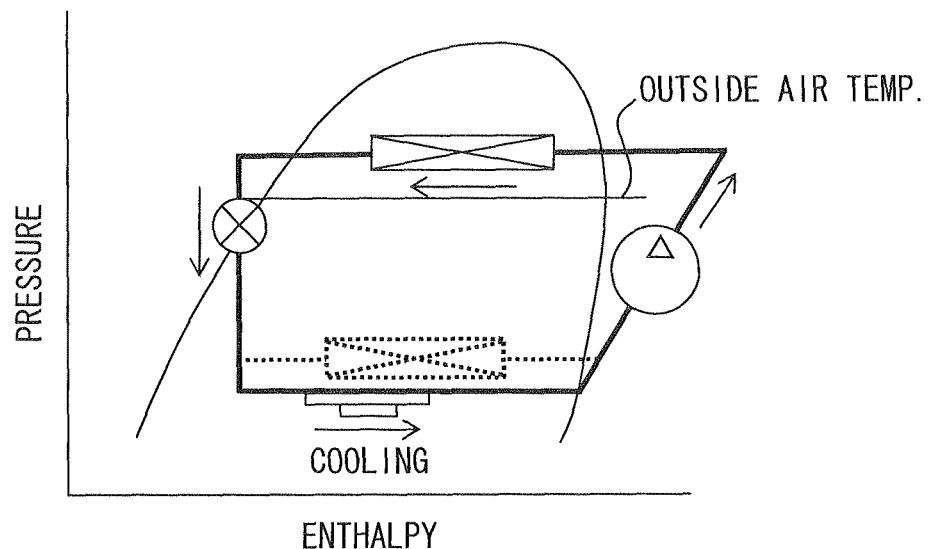
FIG. 6 is a Mollier chart illustrating an operation state of a refrigeration cycle in the second embodiment.

As shown in FIG. 5, during charge of a high-voltage battery 110, a controller 180 works as follows: after the temperature of a switching element 141 exceeds the predetermined temperature and charge is turned off (step S100 to step S104), in step S205, an inverter integrated charger 140 is made to work as an inverter, and a compressor 121 is driven by a motor 130, the degree of opening of the valve in an electromagnetic expansion valve 123 is adjusted, and a cooling fan 122a is turned on. As shown in FIG. 6, by carrying out adjustment of the degree of opening of the valve in the electromagnetic expansion valve 123, the controller 180 controls so that a pressure difference between the high pressure side and the low pressure side of a refrigeration cycle 120 is generated. That is, the liquid phase refrigerant flowing out from a condenser 122 is expanded and has its pressure decreased by the electromagnetic expansion valve 123 so that it becomes a low temperature (for example, about 0° C.) and a low pressure as it flows into an evaporator 124. An air blowing fan 124a is off, so in the evaporator 124, the liquid phase refrigerant is not gasified as the refrigerant flows into a gas/liquid separator 125. Then, the liquid phase refrigerant at a low temperature is accumulated in a refrigerant reservoir portion 135.

As a result, a heat exchanger 127 can cool a switching element 141 using the liquid phase refrigerant at a low temperature on the low pressure side when the refrigeration cycle 120 is turned on, so that the cooling effect can be improved over that in the aforementioned the first embodiment. That is, as the liquid phase refrigerant at a low temperature is used, it is possible to accumulate more latent heat, and the sensible heat until the predetermined temperature is reached after evaporation can be expected, so that the cool storage quantity can be increased. As a result, it is possible to prevent the state when the inverter integrated charger 140 has to be used frequently as an inverter, and it is possible to prolong the time when it can be used as a charger, thus charging can be realized in a shorter time.

Figure 7:
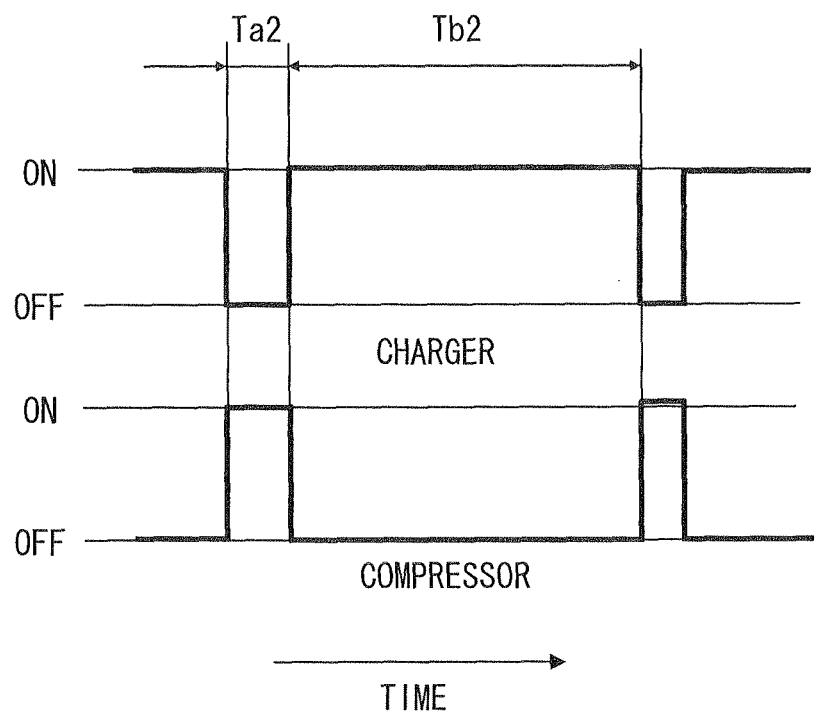
FIG. 7 is a time chart illustrating an operation state of the inverter integrated charger in the second embodiment.

According to an example of computing of the thermal balance for a device with the aforementioned control, suppose the thermal power generated by the switching element 141 when charged, with 200 cc of the liquid phase refrigerant at 0° C. accumulated in the refrigerant reservoir portion 135, just as in the first embodiment is 200 W, if this thermal power is entirely used in gasification of the refrigerant, it is possible to keep cooling in Tb2 of about 6 min as shown in FIG. 7. The time needed for accumulating 200 cc of the liquid phase refrigerant is Ta2=about 30 sec. Suppose the refrigerating ability of the refrigeration cycle 120 is, for example, 2.5 kW. As a matter of fact, the time may not be what computed above due to difference in various conditions, such as influence of the startup time of the compressor, the external air temperature, thermal power generated, etc.

Third Embodiment

Figure 8:
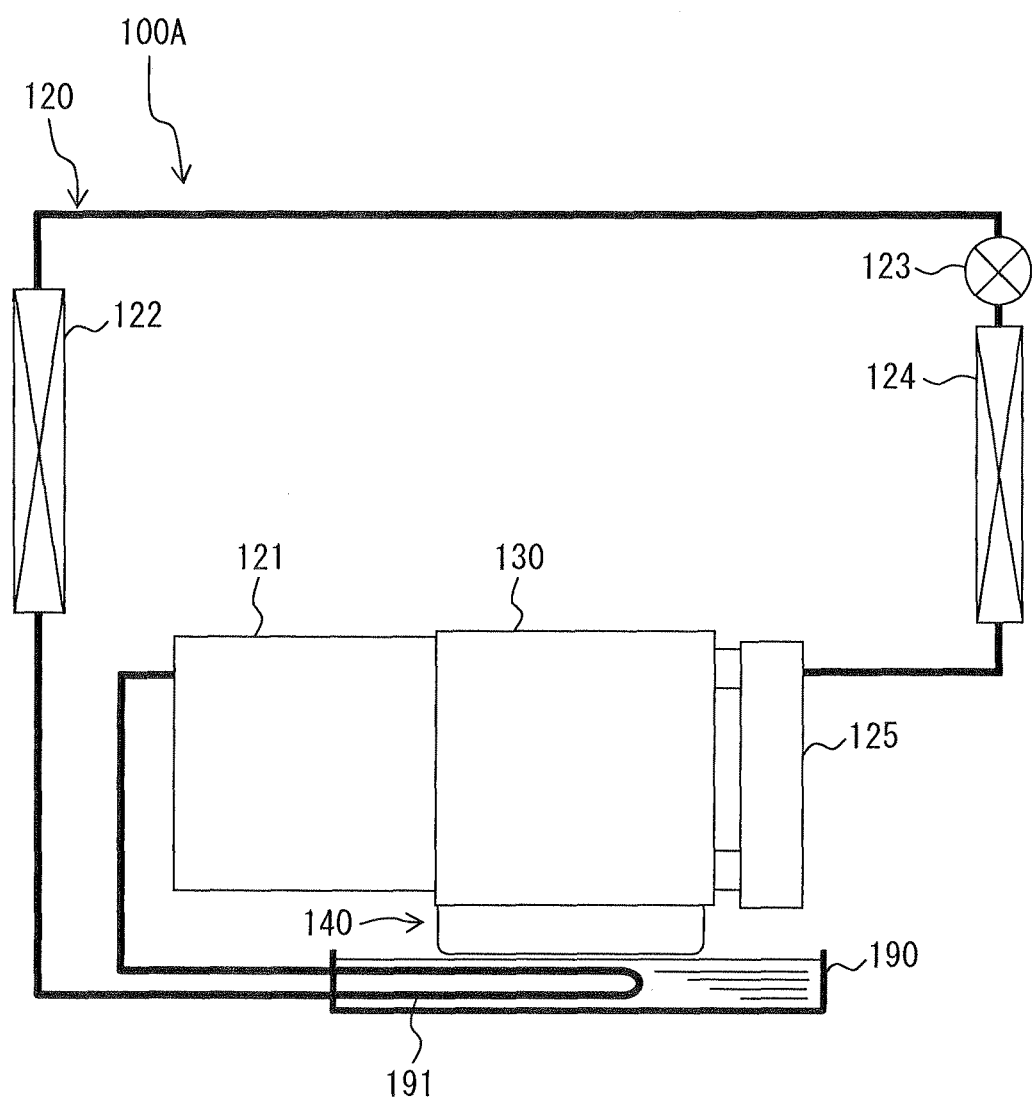
FIG. 8 is a schematic diagram illustrating a constitution of a power supply device for a vehicle in a third embodiment.

As shown in FIG. 8, a power supply device 100A for vehicle in a third embodiment differs from the power supply device 100 for a vehicle in the aforementioned first embodiment in that it has a receptacle (receiving part) 190 and a heating part 191 added.

Here, the receptacle 190 is a shallow dish member opening on the upper side. It is arranged beneath an inverter integrated charger 140, and it is anchored on a housing 131 of a motor 130. When a switching element 141 is cooled by a heat exchanger 127, the receptacle 190 receives and stores the dew water generated due to dew condensation of the water vapor in the air.

The heating part 191 is a heating means (heating unit) that heats up and evaporates the dew water collected in the receptacle 190. For example, it may be formed by a portion of the high pressure side refrigerant pipeline that connects the ejecting side of a compressor 121 and the refrigerant inlet side of a condenser 122. A portion of the aforementioned high pressure side refrigerant pipeline is arranged in the receptacle 190.

When the vehicle is stopped from running, if charge to a high-voltage battery 110 is carried out, the temperature of the switching element 141 rises, and, at the same time, the switching element 141 is cooled by the liquid phase refrigerant in a refrigerant reservoir portion 135. However, due to cooling in this case, dew water may be formed from the water vapor in the air on the outer side of the inverter integrated charger 140. When the vehicle is brought into, for example, a garage for charging, the dew water may drip to the floor.

In the third embodiment, the receptacle 190 is adopted to receive the dew water generated in cooling. Consequently, when the vehicle is brought into the garage for charging as mentioned previously, it is possible to prevent the dew water from dripping on the floor. In addition, when a refrigeration cycle 120 is turned on during charging while the vehicle is stopped from running or during running of the vehicle, the refrigerant at high temperature and high pressure ejected from the compressor 121 flows in the refrigerant pipeline that forms the heating part 191. In this case, the dew water accumulated in the receptacle 190 can be evaporated by the heating part 191, so that it is possible to avoid the man-hour needed for exhausting the dew water accumulated in the receptacle 190.

In addition, a sponge or other water absorbing material may be arranged in the receptacle 190 for preventing overflow of dew water. Also, as the heating part 191, a heating means using an electric heater or the like may be adopted in place of the aforementioned high pressure side refrigerant pipeline.

Fourth Embodiment

In the following, a power supply device 100B for a vehicle in a fourth embodiment will be explained with reference to FIG. 9 and FIG. 10. In the fourth embodiment, different from the power supply device 100 for a vehicle in the first embodiment and the second embodiment, the position for setting an inverter integrated charger 140 is changed.

Figure 9:
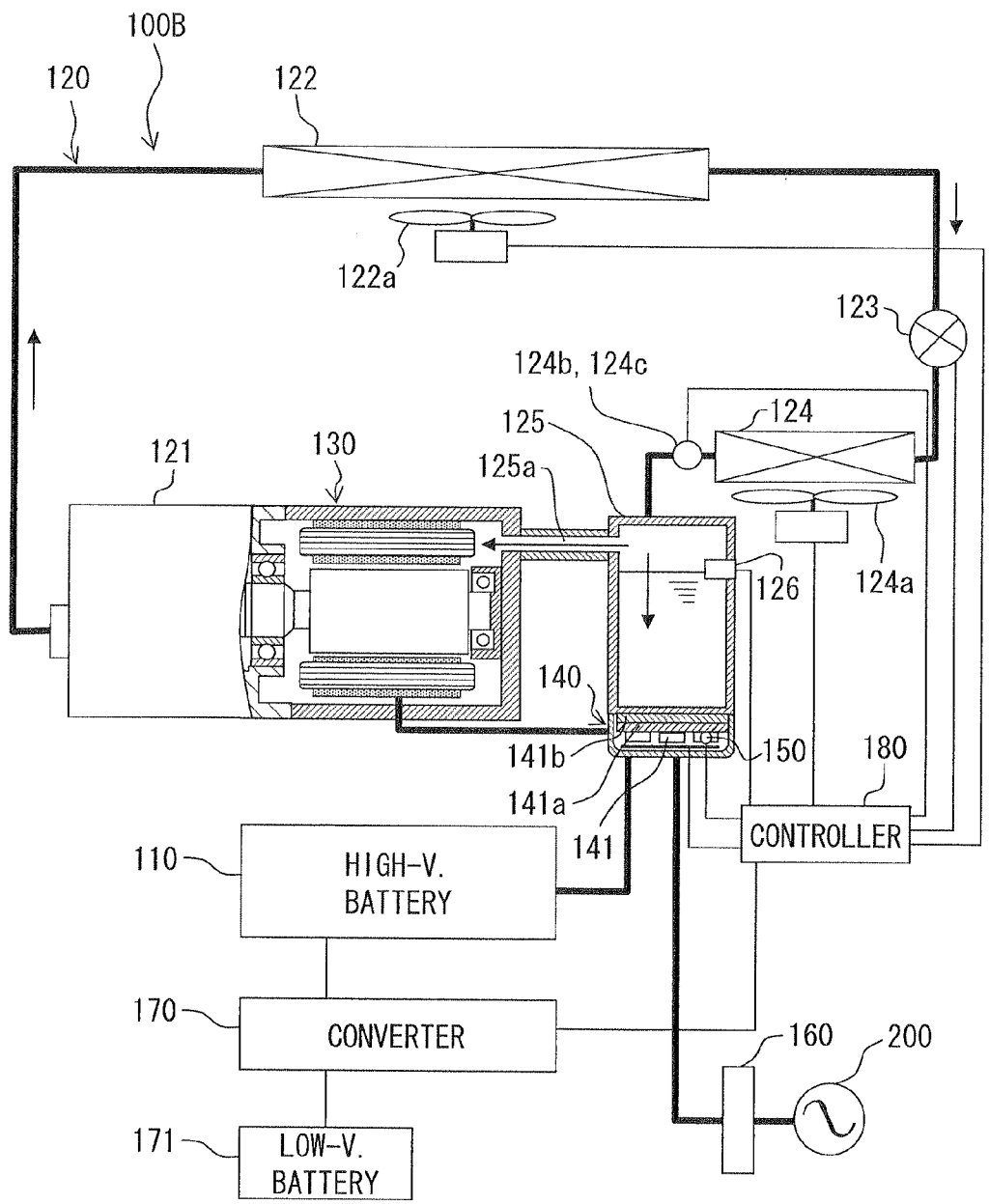
FIG. 9 is a schematic diagram illustrating a constitution of a power supply device for a vehicle in a fourth embodiment.
Figure 10:
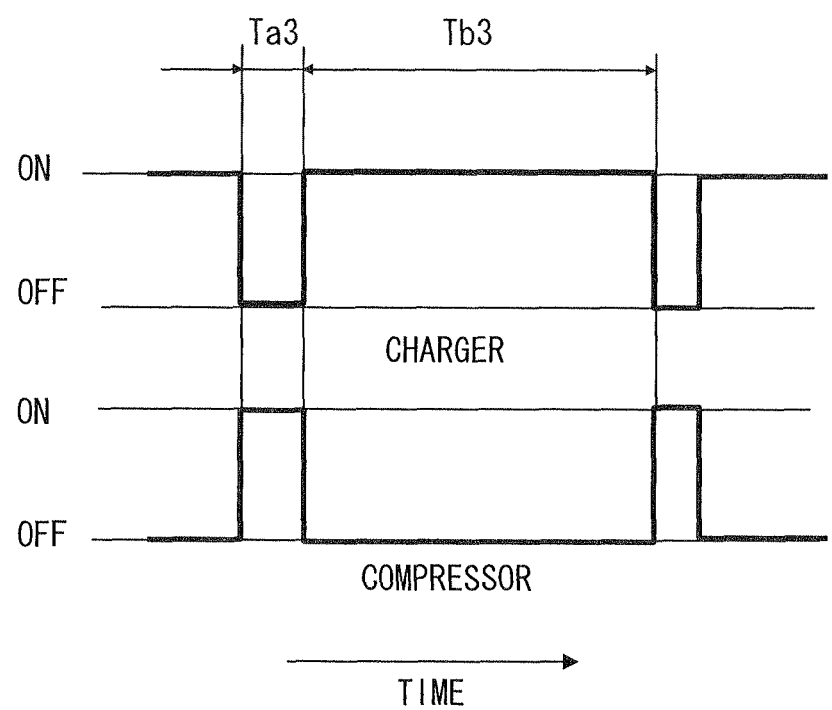
FIG. 10 is a time chart illustrating an operation state of an inverter integrated charger in the fourth embodiment.

As shown in FIG. 9, the inverter integrated charger 140 is arranged monolithically on the bottom wall portion of a gas/liquid separator 125 as the refrigerant reservoir portion. That is, a switching element 141 in the inverter integrated charger 140 is anchored via an insulating plate 141a and a heat dissipating plate 141b on the bottom wall portion of the gas/liquid separator 125. Consequently, the switching element 141 is cooled by the liquid phase refrigerant accumulated in the gas/liquid separator 125. In this way, according to this embodiment, the gas/liquid separator 125 becomes a heat exchanger that cools the portion of the inverter integrated charger 140 that should be cooled. In addition, this embodiment differs from the first and second embodiments in that the refrigerant reservoir portion 135 in the motor 130 is eliminated. Consequently, the connecting channel 125b that connects the interior of the gas/liquid separator 125 and the refrigerant reservoir portion 135 is also eliminated.

The main features of control of charge to a high-voltage battery 110 by a controller 180 is the same as that in the aforementioned second embodiment (flow chart shown in FIG. 5), and the switching element 141 can be cooled in charge mode.

According to this embodiment, because the inverter integrated charger 140 is formed integrated with the gas/liquid separator 125, the inverter integrated charger 140 can be directly cooled by the gas/liquid separator 125, and cooling can be carried out efficiently.

According to an example of computing for a device with the aforementioned control, suppose the capacity of the gas/liquid separator 125 is 200 cc, the thermal power absorbed for 200 cc of the liquid phase refrigerant at 0° C. to become a gas phase refrigerant of 35° C. is about 30 kJ. Suppose the thermal power generated by the switching element 141 is 100 W, as shown in FIG. 10, it is possible to keep cooling for a time of Tb3=about 5 min. On the other hand, suppose the power of a refrigeration cycle 120 is 2.5 kW, the time needed for accumulating the liquid phase refrigerant becomes Ta3=about 12 sec. As a matter of fact, the time may not be what computed above due to difference in various conditions, such as the power of the refrigeration cycle 120 of the specific system, the capacity of the gas/liquid separator 125, the thermal power of the inverter integrated charger 140, etc. However, it is clear that the time rate can be established.

Fifth Embodiment

In the following, a power supply device 100C for a vehicle in a fifth embodiment will be explained with reference to FIG. 11 and FIG. 12. The fifth embodiment differs from the power supply device 100B for a vehicle in that it has the following parts added: a refrigerant reservoir portion 135 arranged in the lower portion in a housing 131 of a motor 130, two level sensors 126a, 126b for detecting the level of the liquid phase refrigerant in a gas/liquid separator 125, a connecting channel 125b for connecting the lower portion of the gas/liquid separator 125 and a refrigerant reservoir portion 135 in the housing 131, and a liquid refrigerant pump 125c that pumps and feeds the liquid phase refrigerant in the connecting channel 125b, and, at the same time, the position for arranging an inverter integrated charger 140 is changed to a bottom portion (bottom wall portion 136) of the housing 131. Here, the positions for arranging the aforementioned refrigerant reservoir portion 135, the connecting channel 125b, and the inverter integrated charger 140 are substantially the same as those in the aforementioned first and second embodiments.

According to this embodiment, the gas/liquid separator 125 as the refrigerant reservoir works as the basic heat exchanger for cooling the inverter integrated charger 140. However, the inverter integrated charger 140 is arranged in the bottom portion of the housing 131, and it is located away from the gas/liquid separator 125. Consequently, the connecting channel 125b is arranged extending from the gas/liquid separator 125 towards the surface of the inverter integrated charger 140 (heat dissipating plate 141b), and, at the same time, it becomes a channel for a flow of the liquid phase refrigerant in the gas/liquid separator 125. It corresponds to the pipe in the present disclosure. The liquid phase refrigerant flowing from the gas/liquid separator 125 through the connecting channel 125b reaches the refrigerant reservoir portion 135.

Figure 11:
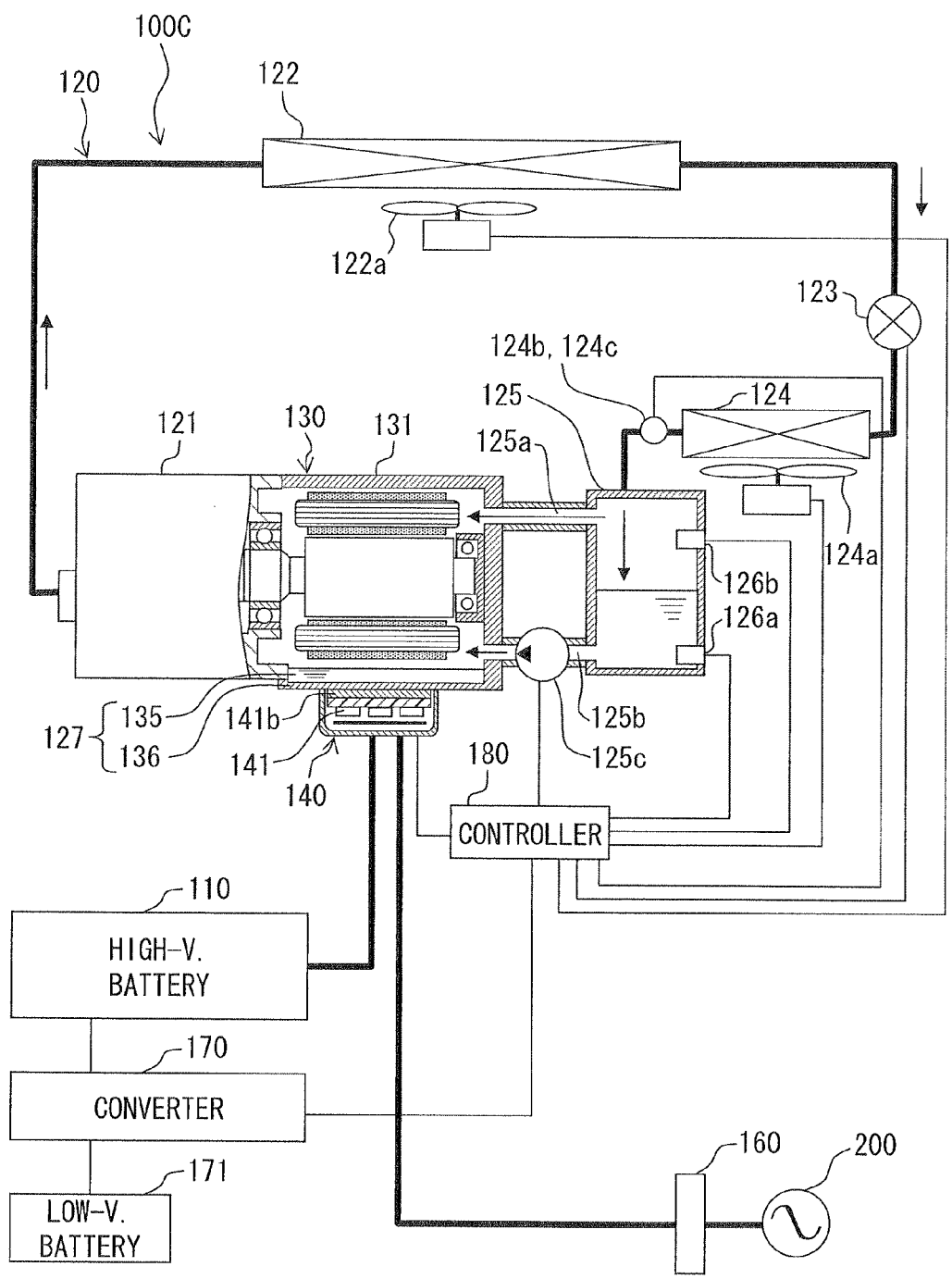
FIG. 11 is a schematic diagram illustrating a constitution of a power supply device for a vehicle in a fifth embodiment.
Figure 12:
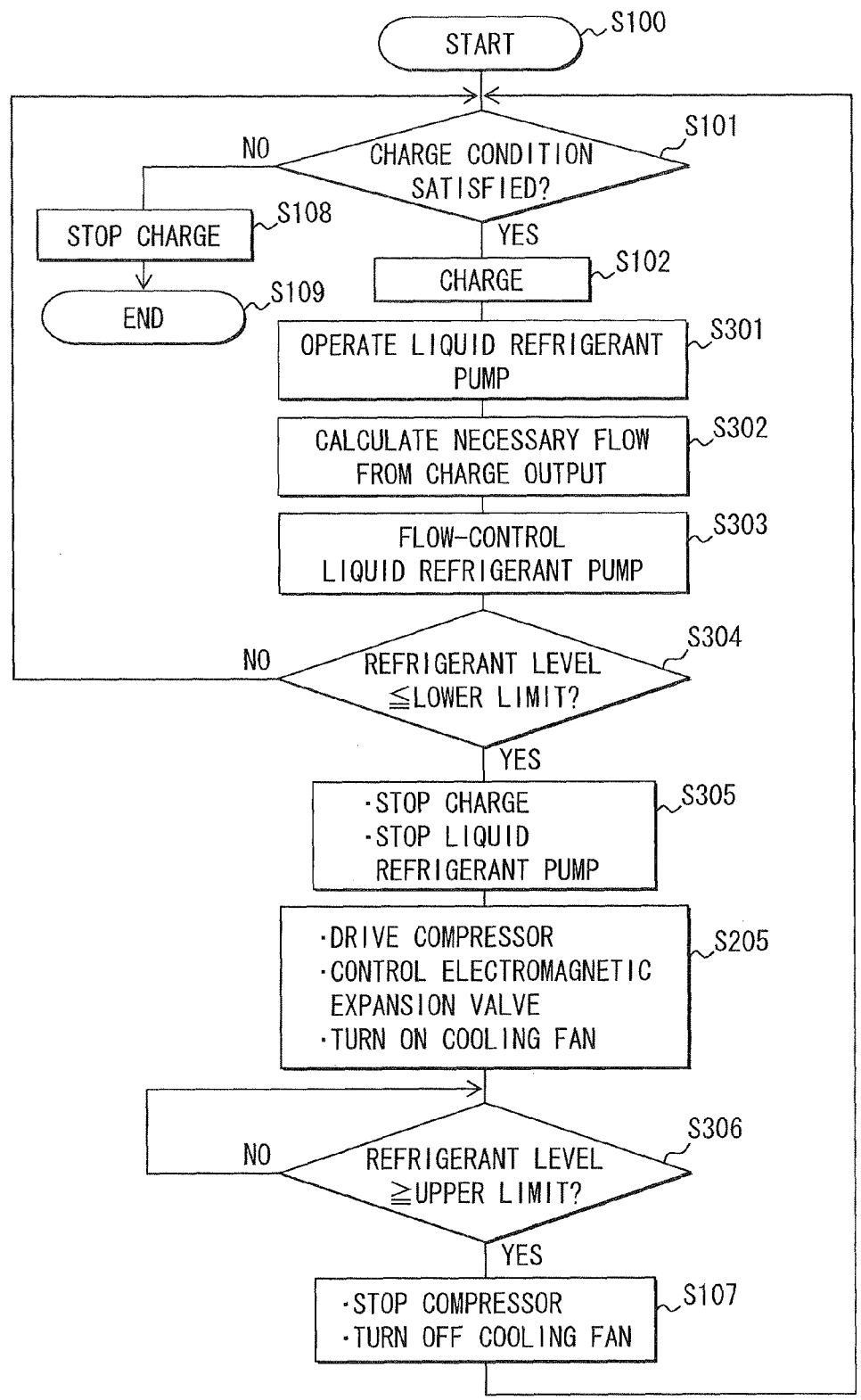
FIG. 12 is a flow chart illustrating the contents of control of an inverter integrated charger carried out by a controller in the fifth embodiment.

As shown in FIG. 11, the level sensor 126a is the first level detecting unit that detects the first predetermined level of the liquid phase refrigerant in the gas/liquid separator 125. Here, the first predetermined level is defined as the lower limit level (refrigerant quantity) below which it would be impossible to cool the inverter integrated charger 140 (switching element 141) by the liquid phase refrigerant because the quantity of the liquid phase refrigerant in the gas/liquid separator 125 becomes too small to carry out sufficient supply of the refrigerant to the refrigerant reservoir portion 135. The level signal of the first predetermined level detected with the level sensor 126a is output to a controller 180.

In addition, the level sensor 126b is the second level detecting unit that detects the second predetermined level of the liquid phase refrigerant in the gas/liquid separator 125. The second predetermined level is defined as the upper limit level (quantity of refrigerant) that allows cooling of the inverter integrated charger 140 (switching element 141) by the liquid phase refrigerant as the quantity of the liquid phase refrigerant in the gas/liquid separator 125 is sufficient to feed the refrigerant to the refrigerant reservoir portion 135. The level signal of the second predetermined level detected with the level sensor 126b is output to the controller 180. The relationship between the first predetermined level and the second predetermined level is first predetermined level<second predetermined level.

A liquid phase refrigerant pump 125c is a refrigerant pumping means arranged in the connecting channel 125b, and it pumps and feeds the liquid phase refrigerant in the gas/liquid separator 125 to the refrigerant reservoir portion 135. Here, the operation rotation velocity of the liquid refrigerant pump 125c is controlled by the controller 180, so that the pumping feeding rate (flow rate) of the liquid phase refrigerant is adjusted.

In the following, the operation of the present embodiment will be explained. In the flow chart shown in FIG. 12, steps S100, S101, S102, S205, S107, S108 and S109 are the same as steps S100, S101, S102, S205, S107, S108 and S109 in the flow chart shown in FIG. 5 explained in the aforementioned second embodiment, respectively.

In step S100, the controller 180 starts the control for charging. In step S101, judgment is made on whether the charge condition is met. If the judgment result of step S101 is that the charge condition is met, in step S102, the controller 180 carries out charge by the inverter integrated charger 140. That is, the controller 180 controls so that the inverter integrated charger 140 works as a charger. As a result, the AC electric power of a commercial power supply 200 is converted to a DC electric power for charging a high-voltage battery 110. Then, in step S301, the controller 180 turns on the liquid refrigerant pump 125c. Then, in step S302, the controller 180 computes the necessary flow rate of the refrigerant corresponding to the output of the inverter integrated charger 140. That is, because the temperature of the switching element 141 rises in company with output of the inverter integrated charger 140, the controller 180 computes the necessary flow rate of the refrigerant for cooling the switching element 141 on the basis of the predetermined correlation map, etc. Then, in step S303, the controller 180 controls the operation rotation velocity (pumping and feeding flow rate) of the liquid refrigerant pump 125c so that the flow rate of the refrigerant becomes the computed necessary value.

Then, in step S304, the controller 180 judges whether the level of the liquid phase refrigerant in the gas/liquid separator 125 is equal to or lower than the first predetermined level (the lower limit level) based on the signal obtained from the level sensor 126a. If the judgment result is YES in step S304, the controller 180 judges that the liquid phase refrigerant in the gas/liquid separator 125 has been used up (decreased in quantity), and it becomes impossible to feed sufficient quantity of the liquid phase refrigerant needed for cooling the inverter integrated charger 140 to the refrigerant reservoir portion 135, so that in step S305, it turns off the inverter integrated charger 140 (it stops charging), and, at the same time, it turns off the liquid refrigerant pump 125c. Step S304 corresponds to the determining means for judging whether cooling of the inverter integrated charger 140 in this disclosure is needed.

Then, in step S205, in order to have the liquid phase refrigerant accumulated in the gas/liquid separator 125, the controller 180 controls the inverter integrated charger 140 to work as an inverter so that a compressor 121 is driven by the motor 130, and it adjusts the degree of opening of the valve in an electromagnetic expansion valve 123 and turns on a cooling fan 122a. As a result, the liquid phase refrigerant flowing out from a condenser 122 is expanded with pressure reduced by the electromagnetic expansion valve 123 so that it becomes low temperature and low pressure (for example, about 0° C.) and flows into an evaporator 124. Because an air blowing fan 124a is off, in the evaporator 124, there is no gasification of the liquid phase refrigerant, and the liquid phase refrigerant just flows into the gas/liquid separator 125 and is accumulated there.

As explained above, as the liquid phase refrigerant is accumulated in the gas/liquid separator 125, in step S306, the controller 180 judges whether the level of the liquid phase refrigerant in the gas/liquid separator 125 is equal to or higher than the second predetermined level (upper limit level) based on the signal obtained from the level sensor 126b. If the judgment result is YES in step S306, it is judged that a sufficient quantity of the liquid phase refrigerant is accumulated in the gas/liquid separator 125, so that in step S107, the controller 180 turns off the inverter integrated charger 140 as well as the motor 130 and hence the compressor 121, and, at the same time, it turns off the cooling fan 122a.

Then, it returns to the operation of step S101 and thereafter, so that the inverter integrated charger 140 is made to work as a charger to charge the high-voltage battery 110. In this case, the switching element 141 is re-cooled by the liquid phase refrigerant accumulated in the refrigerant reservoir portion 135 from the gas/liquid separator 125 by the liquid refrigerant pump 125c.

In this embodiment, the inverter integrated charger 140 can be cooled by the liquid phase refrigerant flowing in the connecting channel 125b by the liquid refrigerant pump 125c. Consequently, even when there is a restriction on the configuration that the gas/liquid separator 125 (refrigerant reservoir portion) and the inverter integrated charger 140 cannot be formed integrated; it is still possible to cool the inverter integrated charger 140.

In addition, because the flow rate of the liquid phase refrigerant flowing in the connecting channel 125b is adjusted corresponding to the output of the inverter integrated charger 140, there is no excessive use of the liquid phase refrigerant, so that it is possible to keep the driving time of the compressor 121 to the lowest possible limit.

In addition, when the inverter integrated charger 140 is cooled by the liquid phase refrigerant accumulated in the gas/liquid separator 125 (refrigerant reservoir portion), the liquid phase refrigerant is evaporated to become the gas phase refrigerant by the heat received from the switching element 141, so that the quantity of the liquid phase refrigerant decreases and finally it would be impossible to carry out cooling. Consequently, the level of the liquid phase refrigerant in the gas/liquid separator 125 (refrigerant reservoir portion) is detected by the level sensors 126a, 126b so that it is possible to make a clear judgment on whether it is necessary to cool the switching element 141.

In step S302 of the aforementioned control operation, the controller 180 computes the necessary flow rate of the refrigerant corresponding to the output of the inverter integrated charger 140. However, instead of it, one may also adopt a scheme in which the necessary flow rate of the refrigerant is computed corresponding to the heat generation rate of the switching element 141.

Sixth Embodiment

Figure 13:
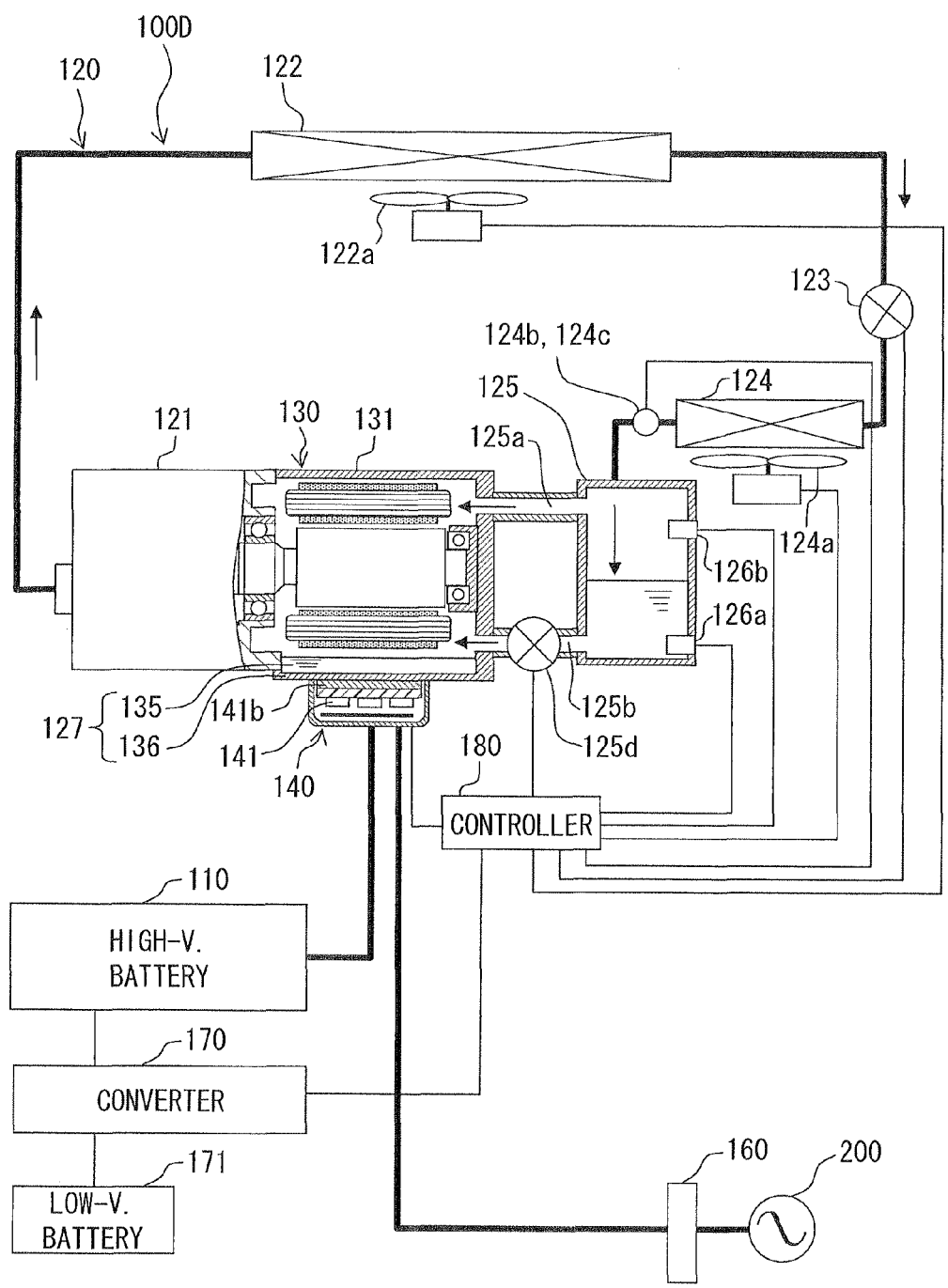
FIG. 13 is a schematic diagram illustrating a constitution of a power supply device for a vehicle in a sixth embodiment.
Figure 14:
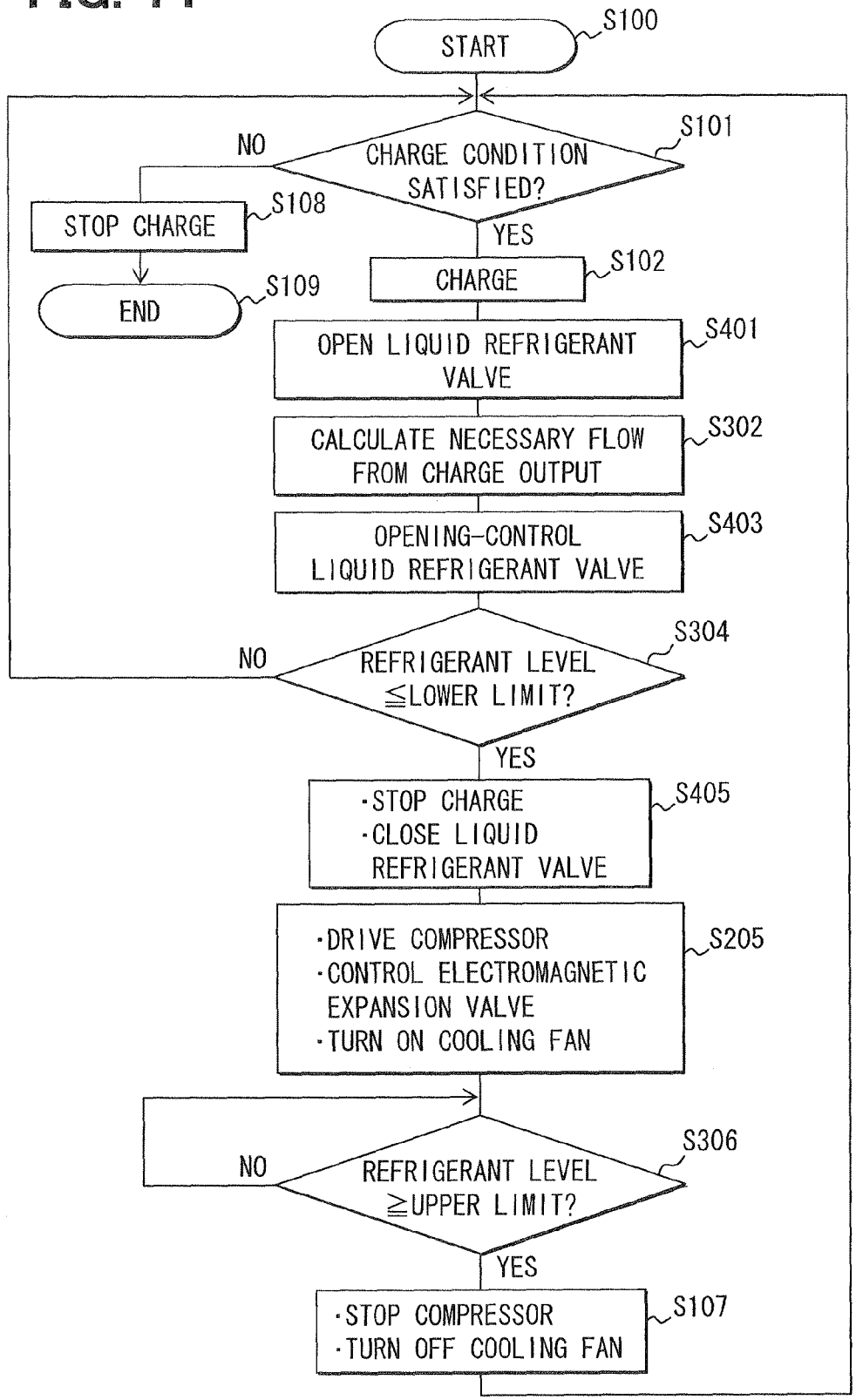
FIG. 14 is a flow chart illustrating the contents of control of an inverter integrated charger carried out by a controller in the sixth embodiment.

In the following, a power supply device 100D for a vehicle in the sixth embodiment will be explained with reference to FIG. 13 and FIG. 14. The sixth embodiment differs from the power supply device 100C for a vehicle in the aforementioned fifth embodiment in that it uses a liquid refrigerant valve 125d in place of the liquid refrigerant pump 125c.

Here, the liquid refrigerant valve 125d is a means for adjusting the flow rate of the refrigerant, and it is arranged on a connecting channel 125b. As it adjusts the degree of opening of the valve, it can adjust the flow rate of the liquid phase refrigerant flowing from the interior of a gas/liquid separator 125 to a refrigerant reservoir portion 135 inside a housing 131. The degree of opening of the valve in the liquid refrigerant valve 125d is controlled by a controller 180.

In the following, the operation of the present embodiment will be explained. The flow chart shown in FIG. 14 differs from the flow chart of FIG. 12 explained with regard to the fifth embodiment in that it has steps S401, S403 and S405 in place of steps S301, S303 and S305, respectively.

The aforementioned controller 180 starts control of charge in step S100, and it then judges whether the charge condition is met in step S101. If it is judged in step S101 that the charge condition is met, the controller 180 carries out the charge by an inverter integrated charger 140 in step S102. That is, the controller 180 controls the inverter integrated charger 140 to work as a charger, so that the AC electric power of a commercial power supply 200 is transformed to a DC electric power for charging a high-voltage battery 110.

Then, in step S401, the controller 180 opens the liquid refrigerant valve 125d. Then, in step S302, the controller 180 computes the necessary flow rate of the refrigerant corresponding to the output of the inverter integrated charger 140. That is, because the temperature of a switching element 141 rises in company with the output of the inverter integrated charger 140, the controller 180 computes the necessary flow rate of the refrigerant needed for cooling the switching element 141 on the basis of the predetermined correlation map, etc. Then, in step S403, the controller 180 controls the degree of opening of the valve in the liquid refrigerant valve 125d so that the flow rate of the refrigerant becomes the computed necessary value.

Then, in step S304, the controller 180 judges whether the level of the liquid phase refrigerant in the gas/liquid separator 125 is equal to or lower than the first predetermined level (lower limit level) based on the signal obtained from a level sensor 126a. If the result of judgment is YES in step S304, the controller 180 judges that the liquid phase refrigerant in the gas/liquid separator 125 has been used up (decreased in quantity), and it becomes impossible to feed sufficient quantity of the liquid phase refrigerant needed for cooling the inverter integrated charger 140 to the refrigerant reservoir portion 135, so that in step S405, it turns off the inverter integrated charger 140 (it stops charging), and, at the same time, it turns off the liquid refrigerant valve 125d, Step S304 corresponds to the determining means for judging whether cooling of the inverter integrated charger 140 in this disclosure is needed.

Then, in steps S205, S306 and S107, the controller 180 carries out the same control as that in the aforementioned fifth embodiment.

In this embodiment, the liquid refrigerant valve 125d is used in place of the liquid refrigerant pump 125c in the aforementioned fifth embodiment, and the same effects as those obtained in the aforementioned fifth embodiment can be realized.

In step S302 in the aforementioned control operation, the controller 180 computes the necessary flow rate of the refrigerant corresponding to the output of the inverter integrated charger 140. However, one may also adopt a scheme in which the necessary flow rate of the refrigerant is computed corresponding to the heat generation rate of the switching element 141, just as in the aforementioned fifth embodiment.

Seventh Embodiment

Figure 16:
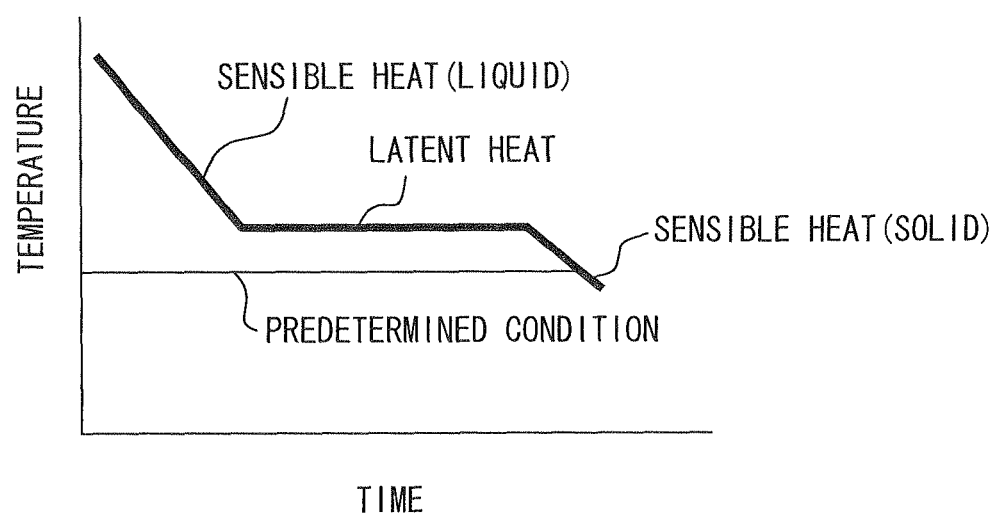
FIG. 16 is a graph illustrating temperature of a cooling storage material versus lapsed time in the seventh embodiment.
Figure 17:
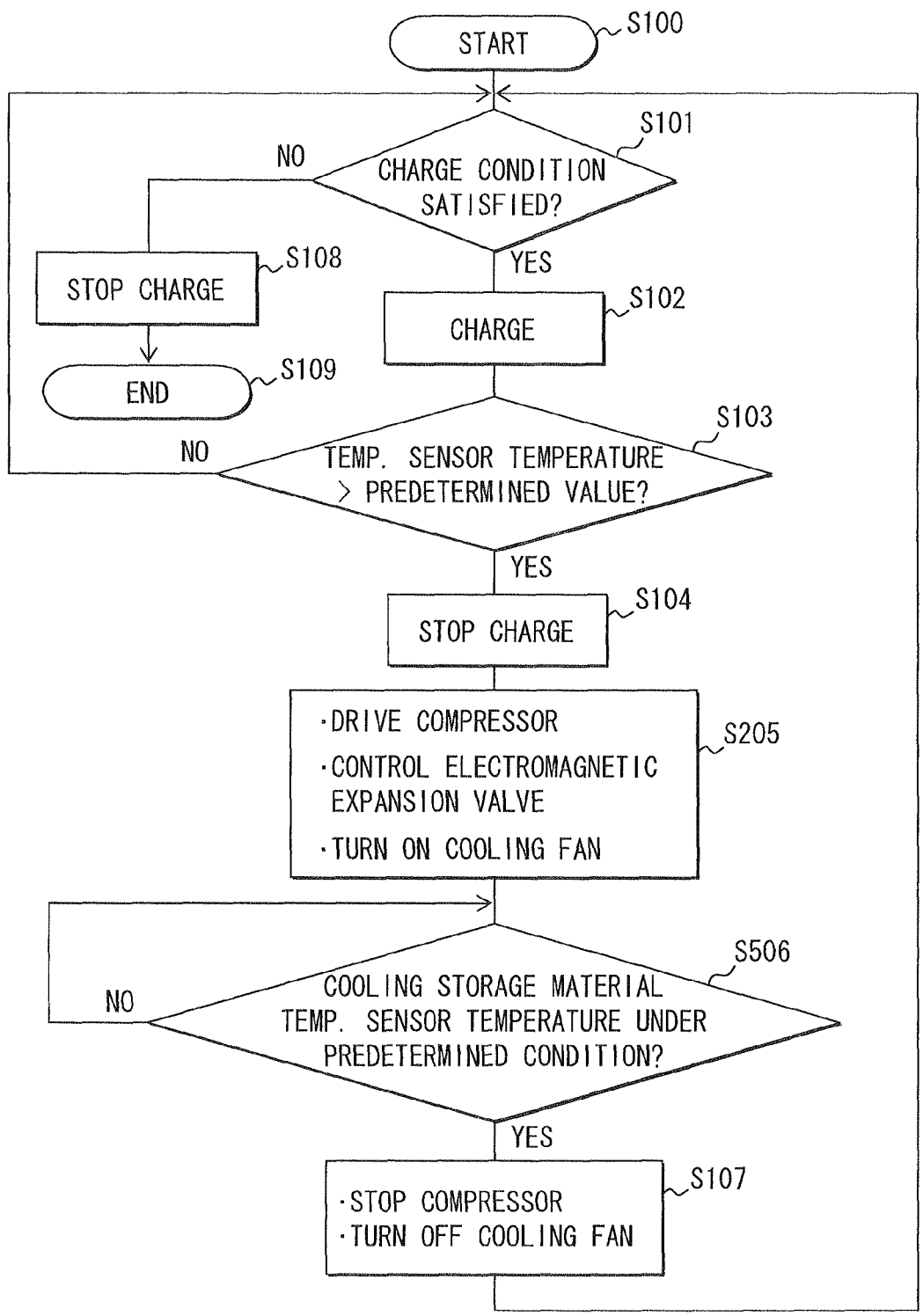
FIG. 17 is a flow chart illustrating the contents of control of an inverter integrated charger carried out by a controller in the seventh embodiment.

In the following, a power supply device 100E for a vehicle in a seventh embodiment will be explained with reference to FIGS. 15 through 17. The seventh embodiment differs from the power supply device 100 for a vehicle in the aforementioned first and second embodiments in that a cool storage part (cooling storage part) 128 is used in place of the heat exchanger unit for cooling an inverter integrated charger 140, and, at the same time, the position for arranging the inverter integrated charger 140 is changed.

In this embodiment, the following parts adopted in the first and second embodiments are eliminated: the gas/liquid separator 125, the connecting channel 125a, the connecting channel 125b, the liquid surface sensor 126 and the refrigerant reservoir portion 135. In addition, a receiver 122b is arranged between a condenser 122 and an electromagnetic expansion valve 123 to carry out separation of gas and liquid of the refrigerant flowing out from the condenser 122 and to accumulate the liquid phase refrigerant, and, at the same time, to have the liquid phase refrigerant flow out to the electromagnetic expansion valve 123.

Figure 15:
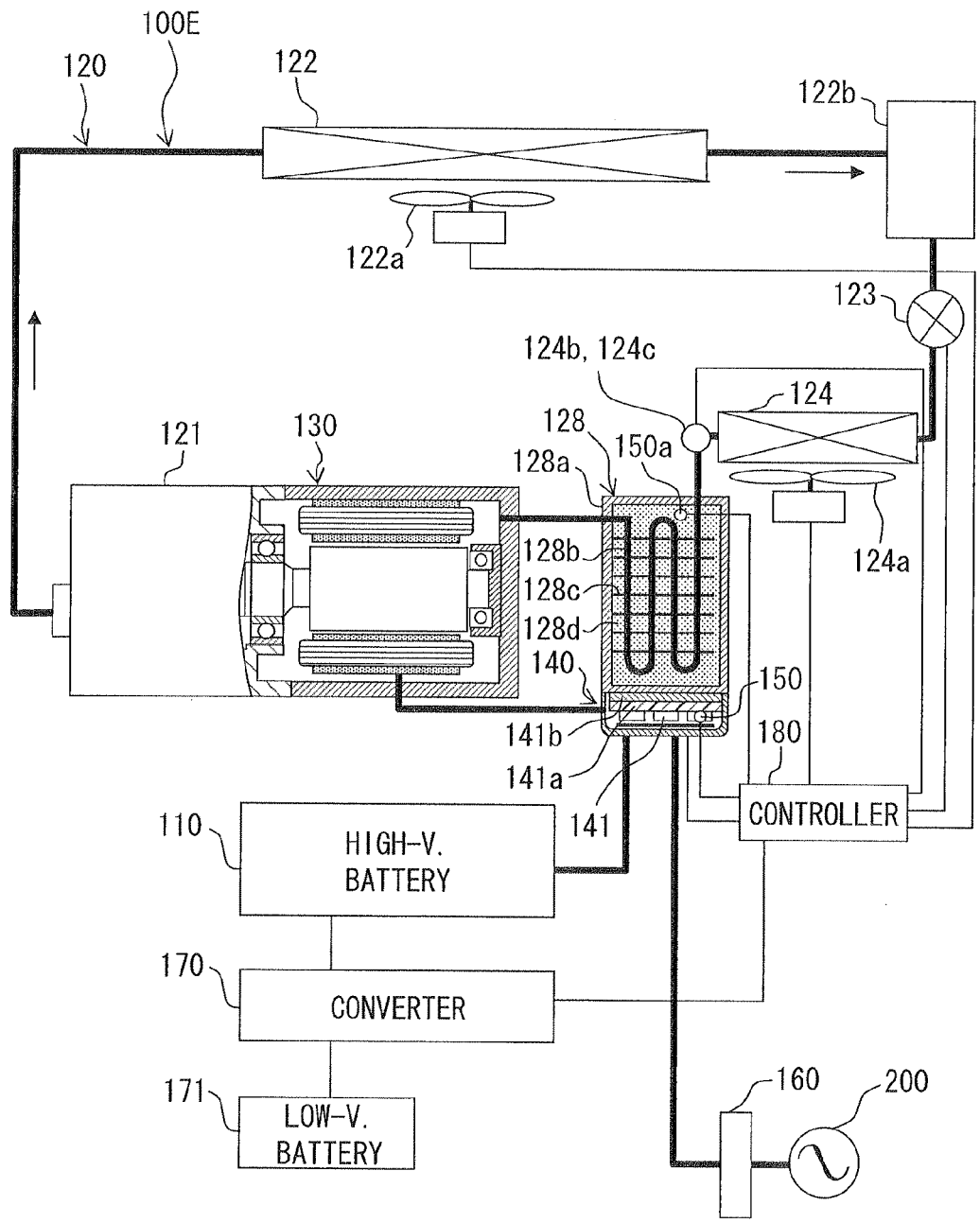
FIG. 15 is a schematic diagram illustrating a constitution of a power supply device for a vehicle in a seventh embodiment.

As shown in FIG. 15, for example, the cool storage part 128 is formed with a refrigerant pipeline 128b, a heat transfer fins 128c and a cool storage material 128d accommodated in a cylindrical shaped cool storage material tank 128a.

Here, the refrigerant pipeline 128b is a pipeline for connecting the outlet side of an evaporator 124 and the inlet side of a compressor 121, and it is arranged in a meandering state in the up/down direction inside the cool storage material tank 128a. On the other hand, the heat transfer fins 128c are thin sheet shaped fins. Multiple fins are laminated in the longitudinal direction (up/down direction) of the refrigerant pipeline 128b so that they are in contact with the surface of the refrigerant pipeline 128b.

The aforementioned cool storage material 128d is for storing cool by cooling with the refrigerant at a low temperature flowing in the refrigerant pipeline 128b at the time of the operation of a refrigeration cycle 120. For example, it may be made of paraffin or water or the like. As the cool storage material 128d is cooled by the refrigerant, its phase changes from liquid to solid so that cold energy is stored, and it can make use of the latent heat that takes place in company with phase change. That is, as shown in FIG. 16, as the cool storage material 128d is cooled by the refrigerant, it can store the sensible heat in company with fall in temperature when it is in liquid phase, the latent heat in company with the phase change from liquid to solid, and the sensible heat in company with fall in temperature in the solid phase. A predetermined quantity of the cool storage material 128d is filled in the cool storage material tank 128a. Here, the cool storage material 128d is in contact with the surface of the refrigerant pipeline 128b and the heat transfer fins 128c.

In the cool storage material tank 128a, a temperature sensor 150a for detecting the temperature of the cool storage material 128d is arranged. The temperature signal detected with the temperature sensor 150a is output to a controller 180. Here, for example, the temperature sensor 150a may be arranged at such an appropriate site that when the cool storage material 128d is heated and the cool storage material 128d changes from the solid phase state to the liquid phase state, it finally becomes the liquid phase state.

Here, the inverter integrated charger 140 is arranged integrated on the bottom portion of the cool storage part 128. More specifically, a switching element 141 in the inverter integrated charger 140 is anchored on the bottom wall portion of the cool storage material tank 128a via an insulating plate 141a and a heat dissipating plate 141b. Consequently, the switching element 141 is cooled by the cool storage material 128d filled in the cool storage material tank 128a.

In the following, the operation of the present embodiment will be explained. The flow chart shown in FIG. 17 differs from the flow chart shown in FIG. 5 explained with regard to the aforementioned second embodiment in that it has step S506 in place of step S106.

In step S100, the controller 180 starts control of charge. It is judged that the charge condition is met in step S101, the charge is carried out by the inverter integrated charger 140 in step S102. In this case, as the inverter integrated charger 140 is turned on, in particular, the switching element 141 generates heat. Here, the switching element 141 is cooled by the cool storage material 128d that stores cool due to operation of the refrigeration cycle 120 as the vehicle runs. However, as the switching element 141 keeps generating heat, the cool storage material 128d has its temperature rise due to the heat of the switching element 141. As the temperature of the cool storage material 128d rises, cooling of the switching element 141 becomes insufficient, and the temperature of the switching element 141 rises significantly.

Consequently, in step S103, when it is judged that the temperature signal obtained from a temperature sensor 150 (the temperature of the switching element 141) exceeds the predetermined temperature (for example, 120° C.), the controller 180 takes it as a sign that cooling should be carried out for the inverter integrated charger 140, so that in step S104, the operation of the inverter integrated charger 140 is turned off, and the charge is then turned off. Then, in step S205, the controller 180 controls the degree of opening of the valve in the electromagnetic expansion valve 123, and, at the same time, it makes the inverter integrated charger 140 work as an inverter, so that the compressor 121 is driven by a motor 130, and a cooling fan 122a is turned on.

As a result, the refrigerant is circulated in the refrigeration cycle 120 by the compressor 121. The refrigerant ejected from the compressor 121 is cooled by the cooling air fed by the cooling fan 122a in the condenser 122, and it then flows out to the receiver 122b. The refrigerant flowing into the receiver 122b is then subject to gas/liquid separation in the interior, and the liquid phase refrigerant mainly flows out to the electromagnetic expansion valve 123. By the electromagnetic expansion valve 123, the liquid phase refrigerant has its pressure reduced and temperature lowered. It then passes the evaporator 124 to reach the cool storage part 128. Here, an air blowing fan 124a is off, so that the liquid phase refrigerant is not gasified in the evaporator 124, and it then flows into the cool storage part 128.

In the cool storage part 128, as the refrigerant at a low temperature flows through the refrigerant pipeline 128b, cool of the refrigerant is transferred via the heat transfer fins 128c to the cool storage material 128d, and the cool storage material 128d stores the cool. As shown in FIG. 16, the temperature of the cool storage material 128d decreases over time, and, when the temperature of the cool storage material 128d becomes lower than the condensing point (the temperature when the latent heat is stored), the phase is completely changed from the liquid phase to the solid phase (freezing). Then, the refrigerant flowing in the refrigerant pipeline 128b is sucked into the compressor 121 again.

Then, in step S506, the controller 180 judges whether the temperature of the cool storage material 128d obtained from the temperature sensor 150a meets the predetermined condition. Here, judgment is made on whether the temperature of the cool storage material 128d becomes equal to or lower than the predetermined temperature. Here, the predetermined temperature of the cool storage material 128d is the judgment temperature set at a few ° C. (2-3° C.) lower than the condensing point of the cool storage material 128d, and it is the temperature at which one can confirm that the cool storage material 128d is fully condensed.

If the judgment result is YES in step S506, the controller 180 judges that the cool storage material 128d has stored sufficient cool needed for cooling the inverter integrated charger 140. Consequently, in step S107, the inverter integrated charger 140 is turned off, and the motor 130, and hence the compressor 121, are turned off, and, at the same time, the cooling fan 122a is turned off.

Then, it returns to the operation of step S101 and thereafter, that is, the inverter integrated charger 140 is made to work as a charger to charge a high-voltage battery 110. In this case, the switching element 141 is cooled again by the cool storage material 128d in the cool storage material tank 128a.

In this embodiment, the cool storage part 128 works as a heat exchanger unit, and, by means of the cool storage material 128d that stores cool by the refrigerant in the refrigeration cycle 120, the inverter integrated charger 140 can be cooled.

According to this embodiment, different from the aforementioned first to sixth embodiments, instead of directly cooling the inverter integrated charger 140 by the refrigerant, the cool storage material 128d is cooled by the outer surface of the refrigerant pipeline 128b, and the inverter integrated charger 140 is then cooled by this cool storage material 128d. Consequently, there is no influence on the flow of the refrigerant of the refrigeration cycle 120, and there is no restriction on the constitution of the refrigeration cycle 120.

In addition, in the refrigeration cycle 120, the site where the cool storage part 128 is arranged is not restricted to between the evaporator 124 and the compressor 121. It may also be arranged at other sites, such as the site between the electromagnetic expansion valve 123 and the evaporator 124.

The means for judgment on whether it is necessary to carry out cooling of the inverter integrated charger 140 in step S103 is not limited to the temperature of the switching element 141. The temperature of the cool storage material 128d may also be adopted. In this case, the temperature sensor 150 for detecting the temperature of the switching element 141 may be eliminated.

Eighth Embodiment

Figure 18:
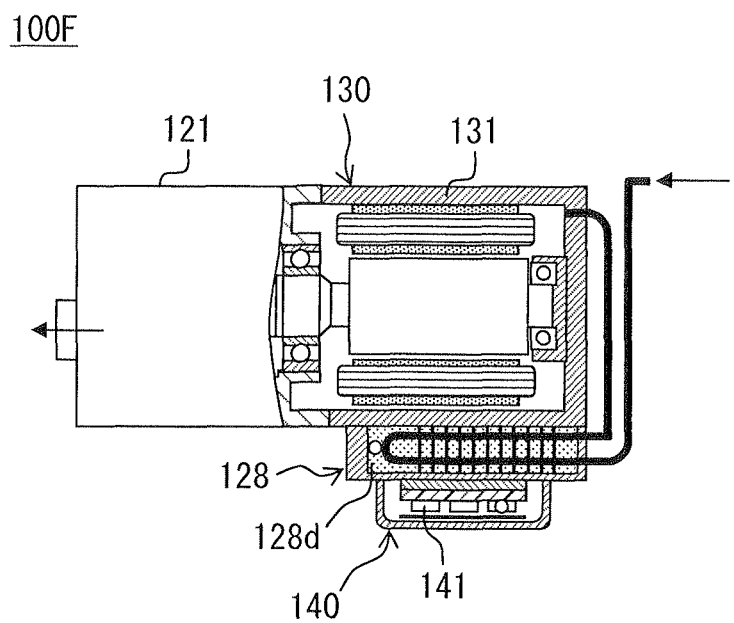
FIG. 18 is a schematic diagram illustrating a portion of a power supply device for a vehicle in an eighth embodiment.

In the following, a power supply device 100F for a vehicle of an eighth embodiment will be explained with reference to FIG. 18. The eighth embodiment differs from the power supply device 100E for a vehicle in the aforementioned seventh embodiment in that the sites for arranging a cool storage part 128 and an inverter integrated charger 140 are changed.

The cool storage part 128 is formed integrated with a housing 131 of a motor 130 (such as the bottom portion). In addition, the inverter integrated charger 140 is arranged integrated with the cool storage part 128 (such as its lower side).

As a result, it is possible to realize a compact structure of the cool storage part 128, the motor 130 and the inverter integrated charger 140. In addition, as the motor 130 and the inverter integrated charger 140 are formed integrated with each other, it is possible to shorten the wiring for connecting them.

Ninth Embodiment

In the following, a power supply device 100G for a vehicle in a ninth embodiment will be explained with reference to FIG. 19. According to the ninth embodiment, a heat insulating material 121b is added as the heat insulating part to what is obtained as a result of an integrating inverter integrated charger 140 with a compressor 121 (electric compressor) as explained in the aforementioned first to third, fifth, sixth and eighth embodiments.

Figure 19:
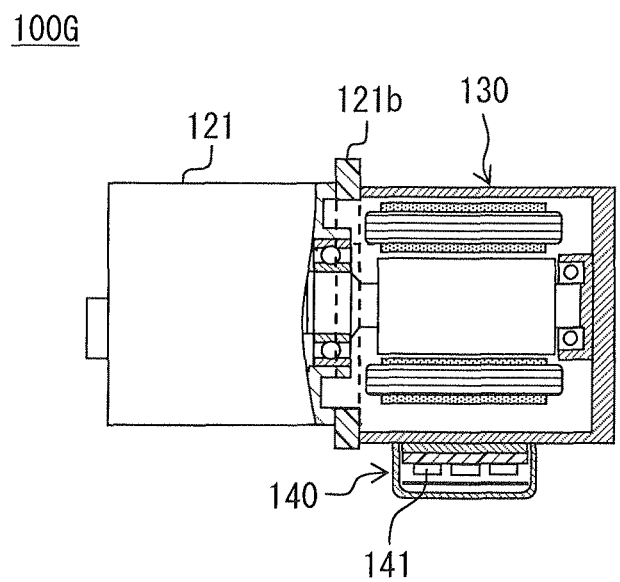
FIG. 19 is a schematic diagram illustrating a portion of a power supply device for a vehicle in a ninth embodiment.

As shown in FIG. 19, the heat insulating material 121b is included between the compressor 121 and a motor 130. So the heat insulating material 121b is included between the compressor 121 and the inverter integrated charger 140.

As a result, the heat generated when the compressor 121 is driven can be stopped by the heat insulating material 121b so that it cannot be transferred to the inverter integrated charger 140. Consequently, it is possible to prevent the adverse influence on cooling of the inverter integrated charger 140. More specifically, after the compressor 121 has been turned on, when switching is carried out so that charge by the inverter integrated charger 140 is controlled, the initial temperature of the inverter integrated charger 140 can be made even lower, so that it is possible to extend the cooling time of the inverter integrated charger 140, that is, it is possible to prolong the charge time.

Modifications of the above embodiments will be described.

In the aforementioned embodiments, when the inverter integrated charger 140 is controlled, in steps S106, S306, the controller 180 judges the level of the liquid phase refrigerant in the refrigerant reservoir portion 135, and it turns off the compressor 121. Now, in place of this scheme, one may also adopt a scheme in which the time (Ta1, Ta2, or the like) that allows accumulation of a sufficient quantity of the liquid phase refrigerant by driving the compressor 121 is computed as the predetermined time beforehand, and the compressor 121 is turned on. Then, after the predetermined time has lapsed, the compressor 121 is turned off, and the mode is switched to the charge. As a result, control can be carried out without the liquid surface sensor 126.

Also, the following scheme may be adopted: as the judgment of steps S106, S306, S506, judgment is made on whether the temperature of the switching element 141 is equal to or lower than the safe temperature that is preset to be lower than a predetermined temperature, and the compressor 121 is turned off accordingly. As a result, just as the aforementioned scheme, it is also possible to carry out control without the liquid surface sensor 126.

In the aforementioned embodiments, the heat exchanger 127 is arranged between the evaporator 124 and the compressor 121, and, as the liquid phase refrigerant for cooling the switching element 141, the refrigerant flowing out from the evaporator 124 is adopted. However, one may also adopt the following scheme in place of the aforementioned scheme: the heat exchanger 127 is arranged between the condenser 122 and the electromagnetic expansion valve 123, and, as the liquid phase refrigerant for cooling the switching element 141, the refrigerant flowing out from the condenser 122 is adopted.

In the above explanation of the representative examples, the switching element 141 is presented as the part of the inverter integrated charger 140 that needs cooling (as a cooling-necessary part of the inverter integrated charger 140). However, a reactor or other heat generating portion as well as the side of the controller circuit 142, etc. may also be taken as the object for cooling corresponding to the specific characteristics of rise in temperature of the various parts. In addition, multiple sites may also be taken as the object of cooling.

In the aforementioned embodiments, in steps S105, step S205, when the compressor 121 is driven, the cooling fan 122a is turned on at the same time. However, one may also adopt the following scheme: in the condenser 122, even there is no cooling air, the heat of the refrigerant still can be naturally released from the outer surface of the tube and the outer surface of the fins to the external air. In this case, although the cooling ability of the refrigerant decreases, the cooling fan 122a may be kept OFF, depending on the external air temperature.

In the above, a scroll-type compression mechanism has been adopted as the compressor 121 in the explanation. However, the present disclosure is not limited to this scheme. One may also adopt other types of compression mechanism, such as piston type, rotary type, etc.

In the above, the gas/liquid separator 125 is connected with the housing 131 of the motor 130 via the connecting channels 125a, 125b. However, one may also adopt a scheme in which it is arranged integrated with the housing 131. In the above, explanation has been made on the case when the controller 180 is a single controller device. However, the present disclosure is not limited to the aforementioned scheme. One may also adopt a scheme in which the controller part for air conditioner and the controller part for charge are separated from each other, and these controller parts are combined via a communication means.

To sum up, the power supply device 100, 100A, 100B, 100C, 100D, 100E, 100F, 100G for a vehicle in accordance with the above embodiments can be described as follows.

A power supply device is adapted to be disposed in a vehicle having a battery 110. The power supply device includes a refrigeration cycle 120 for air conditioning, a motor 130, an inverter-integrated charger 140, a heat exchanger unit 127, 125, 128, and a controller 180. The refrigeration cycle 120 includes a compressor 121, a condenser 122, an expansion valve 123, and an evaporator 124. The motor 130 is configured to drive the compressor 121. The inverter-integrated charger 140 is configured to selectively control operation of the motor 130 using electrical power of the battery 110 and charge of the battery 110 with external power 200. The heat exchanger unit 127, 125, 128 is disposed in the refrigeration cycle 120, and is configured to cool a cooling-necessary part 141 of the inverter-integrated charger 140 using refrigerant in the refrigeration cycle 120. The controller 180 is configured to control operation of the inverter-integrated charger 140, and includes a determining means S103, S304 for determining whether the cooling-necessary part 141 needs to be cooled. When a traveling function of the vehicle is stopped and the battery 110 is charged with the external power 200, the controller 180 makes the inverter-integrated charger 140 serve as: a charger to perform the charge of the battery 110; or an inverter to control the operation of the motor 130, thereby driving the compressor 121, upon determination that the cooling-necessary part 141 needs to be cooled by the determining means S103, S304.

According to the present disclosure, when the traveling function of the vehicle is turned off, the inverter integrated charger 140 is made to work as a charger, so that the high-voltage battery 110 can be charged. In this case, the cooling-necessary part 141 of the inverter integrated charger 140 is cooled by the heat exchanger unit 127 using the refrigerant inside the refrigeration cycle 120. However, as the aforementioned cooling operation is carried out, as the refrigerant receives heat from the cooling-necessary part 141, the cooling effect decreases, and the temperature of the cooling-necessary part 141 rises. As a result, the controller 180 works as follows: from the result of judgment by the determining means S103, S304, if judgment is made that the cooling-necessary part 141 actually needs to be cooled, the inverter integrated charger 140 is made to work as an inverter, and the operation of the motor 130 is controlled to drive the compressor 121. As a result, the refrigerant is circulated inside the refrigeration cycle 120, and it is cooled and condensed in the condenser 122, followed by reflux to the heat exchanger unit 127. Consequently, as the cooled refrigerant is used, it is possible to keep cooling the cooling-necessary part 141 in charge mode.

The heat exchanger unit 127, 125, 128 may be a refrigerant reservoir portion 127, 125 in which liquid-phase refrigerant in the refrigeration cycle 120 is stored.

According to the present disclosure, it is possible to form the heat exchanger unit 127, 125, 128 that makes effective use of the liquid phase refrigerant in the refrigeration cycle 120.

The inverter-integrated charger 140 may be formed integrally with the refrigerant reservoir portion 127, 125.

According to the present disclosure, the inverter integrated charger 140 can be directly cooled by the refrigerant reservoir portion 127, 125, so that effective cooling can be realized.

The inverter-integrated charger 140 may be located away from the refrigerant reservoir portion 125. The power supply device may further include a pipe 125b that extends from the refrigerant reservoir portion 125 toward a surface of the inverter-integrated charger 140 so that liquid-phase refrigerant in the refrigerant reservoir portion 125 flows through the pipe 125b.

According to the present disclosure, the inverter integrated charger 140 can be cooled by the liquid phase refrigerant flowing through the pipe 125b. Consequently, even when the refrigerant reservoir portions 127, 125 and the inverter integrated charger 140 are not formed integrated with each other due to restriction on the sites for arranging, it is still possible cool the inverter integrated charger 140.

The power supply device may further include one of: a liquid refrigerant pump 125c that is disposed at the pipe 125b and configured to pressure-feed liquid-phase refrigerant, the controller 180 controlling an amount of refrigerant pressure-fed by the liquid refrigerant pump 125c in accordance with an output of the inverter-integrated charger 140 or an amount of heat generation by the cooling-necessary part 141; and a liquid refrigerant valve 125d that is disposed at the pipe 125b and configured to regulate a flow rate of liquid-phase refrigerant in the pipe 125b through change of an opening degree of the liquid refrigerant valve 125d, the controller 180 controlling the opening degree of the liquid refrigerant valve 125d in accordance with the output of the inverter-integrated charger 140 or the amount of heat generation by the cooling-necessary part 141.

According to the present disclosure, it is possible to adjust the flow rate of the liquid phase refrigerant flowing in the pipe 125b corresponding to the output of the inverter integrated charger 140 or the heat generation rate of the cooling-necessary part 141. Consequently, it is possible to prevent excessive use of the liquid phase refrigerant, and it is possible to suppress the driving time of the compressor 121 to the shortest possible limit.

The heat exchanger unit 127, 125, 128 may be a cooling storage part 128 having a cooling storage material 128d that performs cooling storage by refrigerant in the refrigeration cycle 120.

According to the present disclosure, by means of the cooling storage material 128d that stores cool by the refrigerant inside the refrigeration cycle 120, it is possible to cool the inverter integrated charger 140, and it is possible to use the cooling storage part 128 as the heat exchanger unit 128.

The power supply device may further include a temperature detecting unit 150 that is configured to detect temperature of the cooling-necessary part 141. The determining means S103 may determine that the cooling-necessary part 141 needs to be cooled when the temperature of the cooling-necessary part 141 is higher than a predetermined temperature.

According to the present disclosure, it is possible to clearly judge whether it is necessary to cool the cooling-necessary part 141 based on the temperature of the cooling-necessary part 141.

The power supply device may further include a first level detecting unit 126a that is configured to detect a level of liquid-phase refrigerant in the refrigerant reservoir portion 127, 125. The determining means S304 may determine that the cooling-necessary part 141 needs to be cooled when the level of liquid-phase refrigerant is lower than a first predetermined level.

According to the present disclosure, when the inverter integrated charger 140 is cooled by the liquid phase refrigerant accumulated inside the refrigerant reservoir portion 127, 125, the liquid phase refrigerant is evaporated and becomes the gas phase refrigerant due to the heat received from the cooling-necessary part 141, so that the quantity of the liquid phase refrigerant decreases, and cooling finally cannot be carried out. Consequently, the level of the liquid phase refrigerant inside the refrigerant reservoir portion 127, 125 is detected, so that it is possible to make a clear judgment on whether cooling of the cooling-necessary part 141 is actually needed.

The controller 180 may fully open the expansion valve 123 at time of the drive of the compressor 121.

Usually, the temperature of the inverter integrated charger 140 in operation is higher than the temperature of the refrigerant (corresponding to the external air temperature) when the refrigeration cycle 120 is turned off. Consequently, for the refrigerant used in the heat exchanger unit 127, 125, 128, even without the refrigerant, which has a lower temperature on the lower pressure side in the portion from the expansion valve 123 to the compressor 121 when the refrigeration cycle 120 is in operation, it is still possible to use the refrigerant corresponding to the external air temperature in cooling the cooling-necessary part 141.

Consequently, when the cooling-necessary part 141 is cooled, even when the expansion valve 123 is fully opened so that the pressure on the high pressure side in the portion from the compressor 121 to the expansion valve 123 and the pressure on the aforementioned low pressure side when the refrigeration cycle 120 is turned on become the same, it is still possible to cool the cooling-necessary part 141 using the refrigerant under such condition. Consequently, as the compressor 121 is driven to ensure that there is no pressure difference between the high pressure side and the low pressure side, it is possible to minimize the power needed for the compressor 121. Also, it is possible to cut the noise level of the compressor 121 corresponding to cut in the power for the compressor 121.

The heat exchanger unit 127 may use liquid-phase refrigerant on a low pressure side of the refrigeration cycle 120 from the expansion valve 123 to the compressor 121 when the refrigeration cycle 120 is in operation. At time of the drive of the compressor 121, the controller 180 may produce a pressure difference between a high pressure side of the refrigeration cycle 120 from the compressor 121 to the expansion valve 123, and the low pressure side of the refrigeration cycle 120, through adjustment of an opening degree of the expansion valve 123.

According to the present disclosure, because the heat exchanger unit 127 can cool the cooling-necessary part 141 by using the liquid phase refrigerant that becomes a low temperature on the low pressure side when the refrigeration cycle 120 is turned on, it is possible for the heat exchanger unit 127 to improve the cooling effect, as compared to the controller 180 fully opening the expansion valve 123 when the compressor 121 is turned on. As a result, it is possible to prevent frequent use of the inverter integrated charger 140 as an inverter, and it is possible to prolong the time when it can be used as a charger, and hence it is possible to realize charge in a shorter time.

The power supply device may further include a second level detecting unit 126, 126b that is configured to detect a level of liquid-phase refrigerant stored in the refrigerant reservoir portion 135, 125. The controller 180 may stop the drive of the compressor 121 and make the inverter-integrated charger 140 serve as the charger to perform the charge of the battery 110 when the level of liquid-phase refrigerant becomes equal to or higher than a second predetermined level.

According to the present disclosure, if the level of the liquid phase refrigerant accumulated in the refrigerant reservoir portion 135 is equal to or higher than the second predetermined level, it is possible to clearly judge that the inverter integrated charger 140 can be sufficiently cooled by the liquid phase refrigerant. Consequently, as the inverter integrated charger 140 is made to work as a charger, it is possible to prevent excessive use of the inverter integrated charger 140 as an inverter and the compressor 121 always being turned on.

The power supply device may further include: a receiving part 190 that receives dew condensation water generated when the inverter-integrated charger 140 is cooled by the heat exchanger unit 127; and a heating unit 191 that is configured to evaporate dew condensation water stored in the receiving part 190.

According to the present disclosure, the dew water generated in cooling can be received by the receiving part 190. Consequently, suppose the vehicle is brought into a home for charging, it is possible to prevent the dew water from dripping on the floor. Also, the dew water accumulated in the receiving part 190 can be evaporated by the heating unit 191, so that it is possible to avoid the man-hour needed for carrying out water exhaustion treatment for the dew water accumulated in the receiving part 190.

The power supply device may further include a cooling fan 122a that is configured to blow cooling air toward the condenser 122. At time of the drive of the compressor 121, the controller 180 may be configured to actuate the cooling fan 122a.

According to the present disclosure, it is possible to improve the cooling ability of the refrigerant in the condenser 122, so that it is possible to feed more liquid phase refrigerant to the heat exchanger unit 127 in a short time.

The inverter-integrated charger 140 may be formed integrally with the compressor 121. The power supply device may further include a heat insulating part 121b that is disposed between the compressor 121 and the inverter-integrated charger 140 and configured to prevent heat of the compressor 121 when the compressor 121 is in operation from transmitting to the inverter-integrated charger 140.

According to the present disclosure, by the heat insulating part 121b, it is possible to prevent the heat generated when the compressor 121 is turned on from transferring to the inverter integrated charger 140, so that it is possible to suppress the adverse influence on cooling of the inverter integrated charger 140.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A power supply device adapted to be disposed in a vehicle having a battery, the power supply device comprising:
   a refrigeration cycle for air conditioning that includes a compressor, a condenser, an expansion valve, and an evaporator;
   a motor that is configured to drive the compressor;
   an inverter-integrated charger that is configured to selectively control operation of the motor using electrical power of the battery and charge of the battery with external power;
   a heat exchanger unit that is disposed in the refrigeration cycle and configured to cool a cooling-necessary part of the inverter-integrated charger using refrigerant in the refrigeration cycle, wherein the heat exchanger unit is a refrigerant reservoir portion in which liquid-phase refrigerant in the refrigeration cycle is stored;
   a controller that is configured to control operation of the inverter-integrated charger and that includes a determining means for determining whether the cooling-necessary part needs to be cooled, wherein when a traveling function of the vehicle is stopped and the battery is charged with the external power, the controller makes the inverter-integrated charger serve as:
   a charger to perform the charge of the battery, or
   an inverter to control the operation of the motor, thereby driving the compressor, upon determination that the cooling-necessary part needs to be cooled by the determining means; and
   a second level detecting unit that is configured to detect a level of liquid-phase refrigerant stored in the refrigerant reservoir portion, wherein the controller stops the drive of the compressor and makes the inverter-integrated charger serve as the charger to perform the charge of the battery when the level of liquid-phase refrigerant becomes equal to or higher than a second predetermined level.

2. The power supply device according to claim 1, wherein the inverter-integrated charger is formed integrally with the refrigerant reservoir portion.

3. The power supply device according to claim 1, wherein the inverter-integrated charger is located away from the refrigerant reservoir portion, the power supply device further comprising a pipe that extends from the refrigerant reservoir portion toward a surface of the inverter-integrated charger so that liquid-phase refrigerant in the refrigerant reservoir portion flows through the pipe.

4. The power supply device according to claim 3, further comprising one of:
   a liquid refrigerant pump that is disposed at the pipe and configured to pressure-feed liquid-phase refrigerant, wherein the controller controls an amount of refrigerant pressure-fed by the liquid refrigerant pump in accordance with an output of the inverter-integrated charger or an amount of heat generation by the cooling-necessary part; and
   a liquid refrigerant valve that is disposed at the pipe and configured to regulate a flow rate of liquid-phase refrigerant in the pipe through change of an opening degree of the liquid refrigerant valve, wherein the controller controls the opening degree of the liquid refrigerant valve in accordance with the output of the inverter-integrated charger or the amount of heat generation by the cooling-necessary part.

5. The power supply device according to claim 1, further comprising a first level detecting unit that is configured to detect a level of liquid-phase refrigerant in the refrigerant reservoir portion, wherein the determining means determines that the cooling-necessary part needs to be cooled when the level of liquid-phase refrigerant is lower than a first predetermined level.

6. The power supply device according to claim 1, wherein the heat exchanger unit is a cooling storage part having a cooling storage material that performs cooling storage by refrigerant in the refrigeration cycle.

7. The power supply device according to claim 1, further comprising a temperature detecting unit that is configured to detect temperature of the cooling-necessary part, wherein the determining means determines that the cooling-necessary part needs to be cooled when the temperature of the cooling-necessary part is higher than a predetermined temperature.

8. The power supply device according to claim 1, wherein the controller fully opens the expansion valve at time of the drive of the compressor.

9. The power supply device according to claim 1, wherein:
the heat exchanger unit uses liquid-phase refrigerant on a low pressure side of the refrigeration cycle from the expansion valve to the compressor when the refrigeration cycle is in operation; and
at time of the drive of the compressor, the controller produces a pressure difference between a high pressure side of the refrigeration cycle from the compressor to the expansion valve, and the low pressure side of the refrigeration cycle, through adjustment of an opening degree of the expansion valve.

10. The power supply device according to claim 1, further comprising:
a receiving part that receives dew condensation water generated when the inverter-integrated charger is cooled by the heat exchanger unit; and
a heating unit that is configured to evaporate dew condensation water stored in the receiving part.

11. The power supply device according to claim 1, further comprising a cooling fan that is configured to blow cooling air toward the condenser, wherein at time of the drive of the compressor, the controller is configured to actuate the cooling fan.

12. The power supply device according to claim 1, wherein the inverter-integrated charger is formed integrally with the compressor, the power supply device further comprising a heat insulating part that is disposed between the compressor and the inverter-integrated charger and configured to prevent heat of the compressor when the compressor is in operation from transmitting to the inverter-integrated charger.

13. The power supply device according to claim 1, further comprising a power receiving part configured to receive the external power from a source external to the vehicle.

14. The power supply device according to claim 13, wherein the power receiving part comprises a plug connectable to the source external to the vehicle to receive the external power.

15. The power supply device according to claim 13, wherein the power receiving part comprises a power cord and a connector connectable to the source external to the vehicle to receive the external power.

16. A power supply device adapted to be disposed in a vehicle having a battery, the power supply device comprising:
a refrigeration cycle for air conditioning that includes a compressor, a condenser, an expansion valve, and an evaporator;
a motor that is configured to drive the compressor;
an inverter-integrated charger that is configured to selectively control operation of the motor using electrical power of the battery and charge of the battery with external power;
a heat exchanger unit that is disposed in the refrigeration cycle and configured to cool a cooling-necessary part of the inverter-integrated charger using refrigerant in the refrigeration cycle;
a controller that is configured to control operation of the inverter-integrated charger and that includes a determining means for determining whether the cooling-necessary part needs to be cooled, wherein when a traveling function of the vehicle is stopped and the battery is charged with the external power, the controller makes the inverter-integrated charger serve as:
a charger to perform the charge of the battery, or
an inverter to control the operation of the motor, thereby driving the compressor, upon determination that the cooling-necessary part needs to be cooled by the determining means;
a receiving part that receives dew condensation water generated when the inverter-integrated charger is cooled by the heat exchanger unit; and
a heating unit that is configured to evaporate dew condensation water stored in the receiving part.

17. The power supply device according to claim 16, wherein the heat exchanger unit is a cooling storage part having a cooling storage material that performs cooling storage by refrigerant in the refrigeration cycle.

18. The power supply device according to claim 16, further comprising a temperature detecting unit that is configured to detect temperature of the cooling-necessary part, wherein the determining means determines that the cooling-necessary part needs to be cooled when the temperature of the cooling-necessary part is higher than a predetermined temperature.

19. The power supply device according to claim 16, wherein the controller fully opens the expansion valve at time of the drive of the compressor.

20. The power supply device according to claim 16, wherein:
the heat exchanger unit uses liquid-phase refrigerant on a low pressure side of the refrigeration cycle from the expansion valve to the compressor when the refrigeration cycle is in operation; and
at time of the drive of the compressor, the controller produces a pressure difference between a high pressure side of the refrigeration cycle from the compressor to the expansion valve, and the low pressure side of the refrigeration cycle, through adjustment of an opening degree of the expansion valve.

* * * * *